US008832584B1

(12) United States Patent
Agarwal et al.

(10) Patent No.: US 8,832,584 B1
(45) Date of Patent: Sep. 9, 2014

(54) QUESTIONS ON HIGHLIGHTED PASSAGES

(75) Inventors: Amit D. Agarwal, Mercer Island, WA (US); Zaur Kambarov, Seattle, WA (US); Tom Killalea, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 250 days.

(21) Appl. No.: 12/414,914

(22) Filed: Mar. 31, 2009

(51) Int. Cl.
G06F 3/048 (2013.01)
G06F 3/0483 (2013.01)
G06F 3/0485 (2013.01)

(52) U.S. Cl.
CPC ............ *G06F 3/0483* (2013.01); *G06F 3/0485* (2013.01)
USPC ........................................................ 715/776

(58) Field of Classification Search
USPC ........................................................ 715/776
See application file for complete search history.

(56) References Cited

U.S. PATENT DOCUMENTS

| | | | |
|---|---|---|---|
| 4,622,627 A | 11/1986 | Rodriguez et al. | |
| 5,418,549 A | 5/1995 | Anderson et al. | |
| 5,495,268 A | 2/1996 | Pearson et al. | |
| 5,544,305 A * | 8/1996 | Ohmaye et al. | 715/776 |
| 5,566,098 A | 10/1996 | Lucente et al. | |
| 5,623,260 A | 4/1997 | Jones | |
| 5,630,159 A | 5/1997 | Zancho | |
| 5,640,553 A | 6/1997 | Schultz | |
| 5,659,742 A | 8/1997 | Beattie et al. | |
| 5,661,635 A | 8/1997 | Huffman et al. | |
| 5,663,748 A * | 9/1997 | Huffman et al. | 345/173 |
| 5,710,922 A | 1/1998 | Alley et al. | |
| 5,711,922 A | 1/1998 | O'Brien et al. | |
| 5,742,905 A | 4/1998 | Pepe et al. | |
| 5,761,485 A | 6/1998 | Munyan | |
| 5,765,168 A | 6/1998 | Burrows | |
| 5,774,109 A | 6/1998 | Winksy et al. | |
| 5,813,017 A | 9/1998 | Morris | |
| 5,845,278 A | 12/1998 | Kirsch et al. | |
| 5,847,698 A * | 12/1998 | Reavey et al. | 345/173 |
| 5,892,900 A | 4/1999 | Ginter et al. | |
| 5,923,861 A | 7/1999 | Bertram et al. | |
| 5,930,026 A | 7/1999 | Jacobson et al. | |
| 5,940,846 A | 8/1999 | Akiyama | |

(Continued)

FOREIGN PATENT DOCUMENTS

| | | |
|---|---|---|
| CN | 1362682 | 8/2002 |
| CN | 1841373 | 10/2006 |

(Continued)

OTHER PUBLICATIONS

U.S. Appl. No. 12/233,948, filed Sep. 19, 2008, Christopher Scofield; Luan Nguyen, "Real Time Audience Interaction in Association With Broadcast Media."*

(Continued)

*Primary Examiner* — Matt Kim
*Assistant Examiner* — Maryam Ipakchi
(74) *Attorney, Agent, or Firm* — Lee & Hayes, PLLC

(57) ABSTRACT

As described herein, passages in a digital work (e.g., eBook, music, movie, picture, etc.) may be highlighted and questions pertaining to those highlights may be developed. The highlights are collected centrally and subsequently supplied to users along with the digital works. Users may further ask questions pertaining to the highlighted passages, and these questions are associated with the highlights. Answers to the questions may also be discovered and provided to the users.

36 Claims, 15 Drawing Sheets

(56) References Cited

U.S. PATENT DOCUMENTS

| | | |
|---|---|---|
| 5,956,048 A | 9/1999 | Gaston |
| 5,960,411 A | 9/1999 | Hartman et al. |
| 5,973,681 A | 10/1999 | Tanigawa et al. |
| 6,018,575 A | 1/2000 | Gross et al. |
| 6,034,839 A | 3/2000 | Hamming |
| 6,037,954 A | 3/2000 | McMahon |
| 6,041,335 A | 3/2000 | Merritt et al. |
| 6,047,189 A | 4/2000 | Yun et al. |
| 6,049,334 A | 4/2000 | Bates et al. |
| 6,049,796 A | 4/2000 | Siitonen et al. |
| 6,064,980 A | 5/2000 | Jacobi et al. |
| 6,073,148 A | 6/2000 | Rowe et al. |
| 6,113,394 A | 9/2000 | Edgar |
| 6,148,340 A | 11/2000 | Bittinger et al. |
| 6,154,757 A * | 11/2000 | Krause et al. ................ 715/205 |
| 6,164,974 A * | 12/2000 | Carlile et al. ................ 434/322 |
| 6,201,771 B1 | 3/2001 | Otsuka et al. |
| 6,233,318 B1 | 5/2001 | Picard et al. |
| 6,300,947 B1 | 10/2001 | Kanevsky |
| 6,308,320 B1 | 10/2001 | Burch |
| 6,331,866 B1 | 12/2001 | Eisenberg |
| 6,331,867 B1 * | 12/2001 | Eberhard et al. ............. 715/864 |
| 6,335,678 B1 | 1/2002 | Heutschi |
| 6,351,750 B1 | 2/2002 | Duga et al. |
| 6,385,596 B1 | 5/2002 | Wiser et al. |
| 6,401,086 B1 | 6/2002 | Bruckner |
| 6,401,239 B1 | 6/2002 | Miron |
| 6,442,651 B2 | 8/2002 | Crow et al. |
| 6,449,627 B1 | 9/2002 | Baer et al. |
| 6,457,030 B1 | 9/2002 | Adams et al. |
| 6,466,951 B1 | 10/2002 | Birkler et al. |
| 6,484,212 B1 | 11/2002 | Markowitz et al. |
| 6,493,734 B1 | 12/2002 | Sachs et al. |
| 6,496,803 B1 | 12/2002 | Seet et al. |
| 6,529,920 B1 | 3/2003 | Arons et al. |
| 6,535,857 B1 | 3/2003 | Clarke, III et al. |
| 6,542,874 B1 | 4/2003 | Walker et al. |
| 6,559,882 B1 | 5/2003 | Kerchner |
| 6,560,699 B1 | 5/2003 | Konkle |
| 6,629,138 B1 | 9/2003 | Lambert et al. |
| 6,631,495 B2 | 10/2003 | Kato et al. |
| 6,642,947 B2 | 11/2003 | Feierbach |
| 6,658,623 B1 | 12/2003 | Schilit et al. |
| 6,685,482 B2 * | 2/2004 | Hopp et al. ................... 434/323 |
| 6,687,878 B1 | 2/2004 | Eintracht et al. |
| 6,704,733 B2 | 3/2004 | Clark et al. |
| 6,721,869 B1 | 4/2004 | Senthil |
| 6,724,403 B1 | 4/2004 | Santoro et al. |
| 6,725,227 B1 | 4/2004 | Li |
| 6,726,487 B1 | 4/2004 | Dalstrom |
| 6,735,583 B1 | 5/2004 | Bjarnestam et al. |
| 6,744,891 B1 | 6/2004 | Allen |
| 6,744,967 B2 | 6/2004 | Kaminski et al. |
| 6,801,751 B1 | 10/2004 | Wood et al. |
| 6,803,930 B1 | 10/2004 | Simonson |
| 6,804,489 B2 | 10/2004 | Stuppy et al. |
| 6,847,966 B1 | 1/2005 | Sommer et al. |
| 6,904,449 B1 | 6/2005 | Quinones |
| 6,912,398 B1 | 6/2005 | Domnitz |
| 6,933,928 B1 * | 8/2005 | Lilienthal ..................... 345/173 |
| 6,938,076 B2 | 8/2005 | Meyer et al. |
| 6,947,922 B1 | 9/2005 | Glance |
| 6,948,135 B1 | 9/2005 | Ruthfield et al. |
| 6,953,343 B2 | 10/2005 | Townshend |
| 6,985,932 B1 | 1/2006 | Glaser et al. |
| 6,992,687 B1 | 1/2006 | Baird et al. |
| 6,999,565 B1 | 2/2006 | Delaney et al. |
| 7,007,015 B1 | 2/2006 | Nayak |
| 7,009,596 B2 | 3/2006 | Seet et al. |
| 7,010,500 B2 | 3/2006 | Aarnio |
| 7,020,654 B1 | 3/2006 | Najmi |
| 7,020,663 B2 | 3/2006 | Hay et al. |
| 7,054,914 B2 | 5/2006 | Suzuki et al. |
| 7,057,591 B1 | 6/2006 | Hautanen et al. |
| 7,062,707 B1 | 6/2006 | Knauft et al. |
| 7,071,930 B2 | 7/2006 | Kondo et al. |
| 7,089,292 B1 | 8/2006 | Roderick et al. |
| 7,092,116 B2 | 8/2006 | Calaway |
| 7,103,848 B2 | 9/2006 | Barsness et al. |
| 7,107,533 B2 | 9/2006 | Duncan et al. |
| 7,111,250 B1 | 9/2006 | Hayward et al. |
| 7,130,841 B2 | 10/2006 | Goel et al. |
| 7,133,506 B1 | 11/2006 | Smith |
| 7,135,932 B2 | 11/2006 | Quadir et al. |
| 7,149,776 B1 | 12/2006 | Roy et al. |
| 7,165,217 B1 | 1/2007 | Kondo |
| 7,188,085 B2 | 3/2007 | Pelletier |
| 7,209,888 B2 | 4/2007 | Frid-Nielsen et al. |
| 7,216,116 B1 | 5/2007 | Nilsson et al. |
| 7,237,123 B2 | 6/2007 | LeVine et al. |
| 7,246,118 B2 | 7/2007 | Chastain et al. |
| 7,249,060 B2 | 7/2007 | Ling |
| 7,249,324 B2 * | 7/2007 | Nakamura et al. ............ 715/776 |
| 7,257,577 B2 | 8/2007 | Fagin et al. |
| 7,290,285 B2 | 10/2007 | McCurdy et al. |
| 7,298,851 B1 | 11/2007 | Hendricks et al. |
| 7,304,635 B2 | 12/2007 | Seet et al. |
| 7,310,629 B1 | 12/2007 | Mendelson et al. |
| 7,313,759 B2 | 12/2007 | Sinisi |
| 7,350,704 B2 | 4/2008 | Barsness et al. |
| 7,355,591 B2 | 4/2008 | Sugimoto |
| 7,375,649 B2 | 5/2008 | Gueziec |
| 7,383,505 B2 * | 6/2008 | Shimizu et al. ............... 715/230 |
| 7,386,480 B2 | 6/2008 | Sarig |
| 7,386,804 B2 * | 6/2008 | Ho et al. ....................... 715/776 |
| 7,398,244 B1 | 7/2008 | Keith |
| 7,401,286 B1 | 7/2008 | Hendricks et al. |
| 7,454,238 B2 | 11/2008 | Vinayak et al. |
| 7,461,406 B2 | 12/2008 | Pelly et al. |
| 7,496,767 B2 | 2/2009 | Evans |
| 7,506,246 B2 | 3/2009 | Hollander et al. |
| 7,506,356 B2 | 3/2009 | Gupta et al. |
| 7,509,270 B1 | 3/2009 | Hendricks et al. |
| 7,533,152 B2 | 5/2009 | Stark et al. |
| 7,539,478 B2 | 5/2009 | Herley et al. |
| 7,562,032 B2 | 7/2009 | Abbosh et al. |
| 7,574,653 B2 | 8/2009 | Croney et al. |
| 7,631,013 B2 | 12/2009 | Parsons et al. |
| 7,634,429 B2 | 12/2009 | Narin et al. |
| 7,656,127 B1 | 2/2010 | Shutt et al. |
| 7,657,459 B2 | 2/2010 | Anderson et al. |
| 7,657,831 B2 * | 2/2010 | Donahue ....................... 715/234 |
| 7,680,849 B2 | 3/2010 | Heller et al. |
| 7,716,224 B2 | 5/2010 | Reztlaff, II et al. |
| 7,720,892 B1 | 5/2010 | Healey, Jr. et al. |
| 7,760,986 B2 | 7/2010 | Beuque |
| 7,788,369 B2 | 8/2010 | McAllen et al. |
| 7,792,756 B2 | 9/2010 | Plastina et al. |
| 7,835,989 B1 | 11/2010 | Hendricks et al. |
| 7,849,393 B1 | 12/2010 | Hendricks et al. |
| 7,865,405 B2 | 1/2011 | Hendricks et al. |
| 7,865,567 B1 | 1/2011 | Hendricks et al. |
| 7,870,022 B2 | 1/2011 | Bous et al. |
| 7,900,133 B2 | 3/2011 | Cragun et al. |
| 7,908,628 B2 | 3/2011 | Swart et al. |
| 8,131,647 B2 | 3/2012 | Siegel et al. |
| 8,165,998 B2 | 4/2012 | Semerdzhiev |
| 8,209,623 B2 | 6/2012 | Barletta et al. |
| 8,260,915 B1 | 9/2012 | Ashear |
| 8,341,210 B1 | 12/2012 | Lattyak et al. |
| 8,370,196 B2 | 2/2013 | Choi et al. |
| 8,417,772 B2 | 4/2013 | Lin et al. |
| 8,429,028 B2 | 4/2013 | Hendricks et al. |
| 8,452,797 B1 | 5/2013 | Paleja et al. |
| 2001/0007980 A1 | 7/2001 | Ishibashi et al. |
| 2001/0025302 A1 | 9/2001 | Suzuki et al. |
| 2001/0026287 A1 | 10/2001 | Watanabe |
| 2001/0027450 A1 | 10/2001 | Shinoda et al. |
| 2001/0027478 A1 | 10/2001 | Meier et al. |
| 2001/0036822 A1 | 11/2001 | Mead et al. |
| 2001/0037328 A1 * | 11/2001 | Pustejovsky et al. ............. 707/3 |
| 2001/0039493 A1 | 11/2001 | Pustejovsky et al. |
| 2001/0049623 A1 | 12/2001 | Aggarwal et al. |
| 2001/0053975 A1 | 12/2001 | Kurihara |

(56) References Cited

U.S. PATENT DOCUMENTS

| | | |
|---|---|---|
| 2002/0002540 A1 | 1/2002 | DeMello et al. |
| 2002/0010707 A1 | 1/2002 | Chang et al. |
| 2002/0010759 A1 | 1/2002 | Hitson et al. |
| 2002/0012134 A1 | 1/2002 | Calaway |
| 2002/0026443 A1 | 2/2002 | Chang et al. |
| 2002/0035697 A1 | 3/2002 | McCurdy et al. |
| 2002/0046261 A1 | 4/2002 | Iwata et al. |
| 2002/0054059 A1 | 5/2002 | Schneiderman |
| 2002/0059415 A1 | 5/2002 | Chang et al. |
| 2002/0069222 A1 | 6/2002 | McNeely |
| 2002/0069312 A1 | 6/2002 | Jones |
| 2002/0087532 A1 | 7/2002 | Barritz et al. |
| 2002/0090934 A1 | 7/2002 | Mitchelmore |
| 2002/0091584 A1 | 7/2002 | Clark et al. |
| 2002/0092031 A1 | 7/2002 | Dudkiewicz et al. |
| 2002/0095468 A1 | 7/2002 | Sakata |
| 2002/0101447 A1 | 8/2002 | Carro |
| 2002/0103809 A1 | 8/2002 | Starzl et al. |
| 2002/0120635 A1 | 8/2002 | Joao |
| 2002/0123336 A1 | 9/2002 | Kamada |
| 2002/0129012 A1 | 9/2002 | Green |
| 2002/0138291 A1 | 9/2002 | Vaidyanathan et al. |
| 2002/0138649 A1 | 9/2002 | Cartmell et al. |
| 2002/0143822 A1 | 10/2002 | Brid et al. |
| 2002/0147724 A1 | 10/2002 | Fries et al. |
| 2002/0165707 A1 | 11/2002 | Call |
| 2002/0184319 A1 | 12/2002 | Willner et al. |
| 2002/0194474 A1 | 12/2002 | Natsuno et al. |
| 2003/0009459 A1* | 1/2003 | Chastain et al. ............... 707/7 |
| 2003/0012216 A1 | 1/2003 | Novaes |
| 2003/0018720 A1 | 1/2003 | Chang et al. |
| 2003/0025731 A1* | 2/2003 | Chastain et al. ............ 345/764 |
| 2003/0028395 A1 | 2/2003 | Rodgers et al. |
| 2003/0040970 A1 | 2/2003 | Miller |
| 2003/0046233 A1 | 3/2003 | Ara et al. |
| 2003/0052928 A1 | 3/2003 | Williams |
| 2003/0058265 A1 | 3/2003 | Robinson et al. |
| 2003/0065642 A1 | 4/2003 | Zee |
| 2003/0069812 A1 | 4/2003 | Yuen et al. |
| 2003/0076513 A1 | 4/2003 | Sugimoto et al. |
| 2003/0093312 A1 | 5/2003 | Ukita et al. |
| 2003/0093382 A1 | 5/2003 | Himeno et al. |
| 2003/0097354 A1 | 5/2003 | Finlay et al. |
| 2003/0105679 A1 | 6/2003 | Krishnan et al. |
| 2003/0110503 A1 | 6/2003 | Perkes |
| 2003/0126123 A1 | 7/2003 | Kodama |
| 2003/0129963 A1 | 7/2003 | Nurcahya |
| 2003/0135495 A1 | 7/2003 | Vagnozzi |
| 2003/0152894 A1 | 8/2003 | Townshend |
| 2003/0163399 A1 | 8/2003 | Harper et al. |
| 2003/0164844 A1 | 9/2003 | Kravitz et al. |
| 2003/0182551 A1 | 9/2003 | Frantz et al. |
| 2003/0190145 A1 | 10/2003 | Copperman et al. |
| 2003/0191737 A1 | 10/2003 | Steele et al. |
| 2003/0204496 A1 | 10/2003 | Ray et al. |
| 2003/0212613 A1 | 11/2003 | Sarig |
| 2004/0002943 A1 | 1/2004 | Merrill et al. |
| 2004/0003398 A1 | 1/2004 | Donian et al. |
| 2004/0015467 A1 | 1/2004 | Fano |
| 2004/0023191 A1 | 2/2004 | Brown et al. |
| 2004/0030686 A1 | 2/2004 | Cardno et al. |
| 2004/0044723 A1 | 3/2004 | Bell et al. |
| 2004/0054499 A1 | 3/2004 | Starzyk et al. |
| 2004/0068471 A1 | 4/2004 | Kato |
| 2004/0078273 A1 | 4/2004 | Loeb et al. |
| 2004/0078757 A1 | 4/2004 | Golovchinsky et al. |
| 2004/0098350 A1 | 5/2004 | Labrou et al. |
| 2004/0117189 A1* | 6/2004 | Bennett ..................... 704/270.1 |
| 2004/0128359 A1 | 7/2004 | Horvitz et al. |
| 2004/0139400 A1 | 7/2004 | Allam et al. |
| 2004/0167822 A1 | 8/2004 | Chasen et al. |
| 2004/0201633 A1* | 10/2004 | Barsness et al. ............. 345/864 |
| 2004/0205457 A1* | 10/2004 | Bent et al. ..................... 715/500 |
| 2004/0210561 A1 | 10/2004 | Shen |
| 2004/0212941 A1 | 10/2004 | Haas et al. |
| 2004/0229194 A1* | 11/2004 | Yang ............................ 434/118 |
| 2004/0237033 A1* | 11/2004 | Woolf et al. .................. 715/512 |
| 2004/0243613 A1 | 12/2004 | Pourheidari |
| 2004/0252692 A1 | 12/2004 | Shim et al. |
| 2004/0254013 A1 | 12/2004 | Quraishi et al. |
| 2004/0254917 A1* | 12/2004 | Brill et al. ......................... 707/3 |
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1* | 1/2005 | Hanlon ........................ 715/511 |
| 2005/0044148 A1 | 2/2005 | Son et al. |
| 2005/0044224 A1 | 2/2005 | Jun et al. |
| 2005/0066219 A1 | 3/2005 | Hoffman et al. |
| 2005/0069225 A1 | 3/2005 | Schneider et al. |
| 2005/0069849 A1 | 3/2005 | McKinney et al. |
| 2005/0076012 A1 | 4/2005 | Manber et al. |
| 2005/0088410 A1 | 4/2005 | Chaudhri |
| 2005/0091604 A1 | 4/2005 | Davis |
| 2005/0097007 A1 | 5/2005 | Alger et al. |
| 2005/0102618 A1 | 5/2005 | Naito |
| 2005/0125222 A1 | 6/2005 | Brown et al. |
| 2005/0132281 A1 | 6/2005 | Pan et al. |
| 2005/0138007 A1 | 6/2005 | Amitay |
| 2005/0138428 A1 | 6/2005 | McAllen et al. |
| 2005/0144895 A1 | 7/2005 | Grimes et al. |
| 2005/0176438 A1 | 8/2005 | Li |
| 2005/0177562 A1 | 8/2005 | Raciborski |
| 2005/0177567 A1 | 8/2005 | Hughes et al. |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0223315 A1* | 10/2005 | Shimizu et al. ............... 715/512 |
| 2005/0228836 A1 | 10/2005 | Bacastow et al. |
| 2005/0250439 A1 | 11/2005 | Leslie |
| 2005/0256822 A1 | 11/2005 | Hollingsworth |
| 2005/0289394 A1 | 12/2005 | Arrouye et al. |
| 2006/0004840 A1 | 1/2006 | Senda |
| 2006/0020469 A1 | 1/2006 | Rast |
| 2006/0031316 A1 | 2/2006 | Forstadius |
| 2006/0047830 A1 | 3/2006 | Nair et al. |
| 2006/0047844 A1 | 3/2006 | Deng |
| 2006/0048184 A1 | 3/2006 | Poslinski et al. |
| 2006/0057960 A1 | 3/2006 | Tran |
| 2006/0061595 A1 | 3/2006 | Goede et al. |
| 2006/0071754 A1 | 4/2006 | Tofts et al. |
| 2006/0075205 A1* | 4/2006 | Martin et al. ................. 711/200 |
| 2006/0075444 A1 | 4/2006 | Dillen |
| 2006/0080261 A1 | 4/2006 | Christal |
| 2006/0098900 A1 | 5/2006 | King et al. |
| 2006/0101328 A1 | 5/2006 | Albornoz et al. |
| 2006/0123053 A1 | 6/2006 | Scannell |
| 2006/0129618 A1 | 6/2006 | Maier |
| 2006/0129924 A1 | 6/2006 | Nelson et al. |
| 2006/0143558 A1 | 6/2006 | Albornoz et al. |
| 2006/0156222 A1* | 7/2006 | Chi et al. ........................ 715/512 |
| 2006/0161578 A1* | 7/2006 | Siegel et al. .................. 707/102 |
| 2006/0175983 A1 | 8/2006 | Crouse et al. |
| 2006/0179137 A1 | 8/2006 | Jennings, III et al. |
| 2006/0190489 A1 | 8/2006 | Vohariwatt et al. |
| 2006/0190568 A1 | 8/2006 | Patterson |
| 2006/0195431 A1 | 8/2006 | Holzgrafe et al. |
| 2006/0209175 A1 | 9/2006 | Cohen et al. |
| 2006/0236240 A1 | 10/2006 | Lebow |
| 2006/0240799 A1 | 10/2006 | Kim et al. |
| 2006/0250994 A1 | 11/2006 | Sasaki et al. |
| 2006/0253441 A1 | 11/2006 | Nelson |
| 2006/0253461 A1 | 11/2006 | de Bonet |
| 2006/0256083 A1 | 11/2006 | Rosenberg |
| 2006/0265518 A1 | 11/2006 | Owens et al. |
| 2006/0281058 A1 | 12/2006 | Mangoaela |
| 2007/0005616 A1 | 1/2007 | Hay et al. |
| 2007/0014404 A1 | 1/2007 | Cha |
| 2007/0016555 A1 | 1/2007 | Ito et al. |
| 2007/0025704 A1 | 2/2007 | Tsukazaki et al. |
| 2007/0039023 A1 | 2/2007 | Kataoka |
| 2007/0050346 A1 | 3/2007 | Goel et al. |
| 2007/0055926 A1 | 3/2007 | Christiansen et al. |
| 2007/0061335 A1 | 3/2007 | Ramer et al. |

(56) References Cited

U.S. PATENT DOCUMENTS

| | | |
|---|---|---|
| 2007/0061803 A1 | 3/2007 | Barrett |
| 2007/0073596 A1 | 3/2007 | Alexander et al. |
| 2007/0078273 A1 | 4/2007 | Hirota |
| 2007/0079383 A1 | 4/2007 | Gopalakrishnan |
| 2007/0094285 A1* | 4/2007 | Agichtein et al. ............ 707/101 |
| 2007/0094351 A1 | 4/2007 | Kalish et al. |
| 2007/0105536 A1 | 5/2007 | Tingo, Jr. |
| 2007/0112817 A1 | 5/2007 | Danninger |
| 2007/0118533 A1* | 5/2007 | Ramer et al. .................... 707/10 |
| 2007/0130109 A1 | 6/2007 | King et al. |
| 2007/0136660 A1 | 6/2007 | Gurcan et al. |
| 2007/0136679 A1 | 6/2007 | Yang |
| 2007/0142934 A1 | 6/2007 | Boercsoek et al. |
| 2007/0150456 A1 | 6/2007 | Lian et al. |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0219983 A1 | 9/2007 | Fish |
| 2007/0233562 A1 | 10/2007 | Lidwell et al. |
| 2007/0233692 A1 | 10/2007 | Lisa et al. |
| 2007/0234209 A1* | 10/2007 | Williams ..................... 715/700 |
| 2007/0238077 A1 | 10/2007 | Strachar |
| 2007/0240187 A1 | 10/2007 | Beach et al. |
| 2007/0242225 A1 | 10/2007 | Bragg et al. |
| 2007/0282809 A1 | 12/2007 | Hoeber et al. |
| 2007/0283173 A1 | 12/2007 | Webb et al. |
| 2007/0288853 A1 | 12/2007 | Neil |
| 2008/0005097 A1 | 1/2008 | Kleewein et al. |
| 2008/0005203 A1 | 1/2008 | Bots et al. |
| 2008/0005664 A1* | 1/2008 | Chandra ..................... 715/513 |
| 2008/0016164 A1* | 1/2008 | Chandra ..................... 709/206 |
| 2008/0027933 A1 | 1/2008 | Hussam |
| 2008/0031595 A1 | 2/2008 | Cho |
| 2008/0040233 A1 | 2/2008 | Wildman et al. |
| 2008/0082518 A1 | 4/2008 | Loftesness |
| 2008/0082911 A1 | 4/2008 | Sorotokin et al. |
| 2008/0089665 A1 | 4/2008 | Thambiratnam et al. |
| 2008/0113614 A1 | 5/2008 | Rosenblatt |
| 2008/0115224 A1 | 5/2008 | Jogand-Coulomb et al. |
| 2008/0120101 A1* | 5/2008 | Johnson et al. ............... 704/235 |
| 2008/0120280 A1 | 5/2008 | Iijima et al. |
| 2008/0133479 A1 | 6/2008 | Zelevinsky et al. |
| 2008/0154908 A1 | 6/2008 | Datar et al. |
| 2008/0163039 A1 | 7/2008 | Ryan et al. |
| 2008/0164304 A1 | 7/2008 | Narasimhan et al. |
| 2008/0165141 A1 | 7/2008 | Christie |
| 2008/0168073 A1* | 7/2008 | Siegel et al. .................. 707/100 |
| 2008/0208833 A1 | 8/2008 | Basmov |
| 2008/0222552 A1* | 9/2008 | Batarseh et al. .............. 715/776 |
| 2008/0235351 A1 | 9/2008 | Banga et al. |
| 2008/0243788 A1 | 10/2008 | Reztlaff et al. |
| 2008/0243828 A1 | 10/2008 | Reztlaff et al. |
| 2008/0259057 A1 | 10/2008 | Brons |
| 2008/0270930 A1 | 10/2008 | Slosar |
| 2008/0293450 A1 | 11/2008 | Ryan et al. |
| 2008/0294674 A1 | 11/2008 | Reztlaff, II et al. |
| 2008/0295039 A1 | 11/2008 | Nguyen et al. |
| 2008/0301820 A1 | 12/2008 | Stevens |
| 2009/0094528 A1* | 4/2009 | Gray et al. .................... 715/745 |
| 2009/0094540 A1* | 4/2009 | Gray et al. .................... 715/764 |
| 2009/0181649 A1 | 7/2009 | Bull et al. |
| 2009/0228774 A1 | 9/2009 | Matheny et al. |
| 2009/0241054 A1 | 9/2009 | Hendricks |
| 2009/0263777 A1* | 10/2009 | Kohn ............................. 434/350 |
| 2009/0319482 A1* | 12/2009 | Norlander et al. ................ 707/3 |
| 2010/0023259 A1 | 1/2010 | Krumm et al. |
| 2010/0081120 A1* | 4/2010 | Nanjiani et al. .............. 434/322 |
| 2010/0125876 A1 | 5/2010 | Craner et al. |
| 2010/0131385 A1 | 5/2010 | Harrang et al. |
| 2010/0188327 A1 | 7/2010 | Frid et al. |
| 2011/0050591 A1 | 3/2011 | Kim et al. |
| 2011/0112671 A1 | 5/2011 | Weinstein |
| 2011/0191710 A1 | 8/2011 | Jang et al. |
| 2011/0295926 A1 | 12/2011 | Battiston et al. |
| 2012/0016774 A1 | 1/2012 | Dicke et al. |
| 2012/0041941 A1 | 2/2012 | King et al. |
| 2012/0079372 A1 | 3/2012 | Kandekar et al. |
| 2012/0227001 A1 | 9/2012 | Gupta et al. |

FOREIGN PATENT DOCUMENTS

| | | |
|---|---|---|
| CN | 101120358 | 2/2008 |
| CN | 101120358 A | 2/2008 |
| EP | 1842150 A2 | 10/2007 |
| JP | 6274493 A | 9/1994 |
| JP | 07078139 | 3/1995 |
| JP | 09179870 | 7/1997 |
| JP | 10091640 | 4/1998 |
| JP | 11074882 | 3/1999 |
| JP | 2000501214 | 2/2000 |
| JP | 2001052016 | 2/2001 |
| JP | 2001052025 | 2/2001 |
| JP | 2001195412 | 7/2001 |
| JP | 2001236358 | 8/2001 |
| JP | 2002099739 A | 4/2002 |
| JP | 2002197079 A | 7/2002 |
| JP | 2002259718 | 9/2002 |
| JP | 2002536736 | 10/2002 |
| JP | 2003016104 | 1/2003 |
| JP | 2003122969 | 4/2003 |
| JP | 2003513384 | 4/2003 |
| JP | 2003516585 | 5/2003 |
| JP | 2003517158 | 5/2003 |
| JP | 2003186910 | 7/2003 |
| JP | 2005056041 | 3/2005 |
| JP | 2006011694 | 1/2006 |
| JP | 2006107496 | 4/2006 |
| JP | 2006129323 | 5/2006 |
| JP | 2006190114 | 7/2006 |
| JP | 2008516297 | 5/2008 |
| JP | 2008527580 | 7/2008 |
| WO | WO 97/20274 * | 6/1997 |
| WO | WO97/20274 | 6/1997 |
| WO | WO9720274 | 6/1997 |
| WO | WO00/45588 | 8/2000 |
| WO | WO0045588 | 8/2000 |
| WO | WO0056055 A2 | 9/2000 |
| WO | WO0075840 A2 | 12/2000 |
| WO | WO01/42978 | 6/2001 |
| WO | WO0239206 | 5/2002 |
| WO | WO2004055647 A2 | 7/2004 |
| WO | WO2006078728 A2 | 7/2006 |

OTHER PUBLICATIONS

Cavanaugh, "EBooks and Accommodations", Teaching Expectional Children, vol. 35 No. 2 p. 56-61 Copyright 2002 CEC.*

Desmoulins et al., "Pattern-Based Annotations on E-books: From Personal to Shared Didactic Content", Proceedings of the IEEE International Workshop on Wireless and Mobile Techniques in Education, 2002, 4 pages.*

Card et al., "3Book: A 3D Electronic Smart Book," Proceedings of the Working Conference on Advanced Visual Interfaces, May 25-28, 2004.*

Beigbeder et al., "An Information Retrieval Model Using the Fuzzy Proximity Degree of Term Occurences", 2005 ACM Symposium on Applied Computing, pp. 1018-pp. 1022.

Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010.

Breu, M. et al., "The Medoc Distrubuted Electronic Library: Accounting and Security Aspects", Electronic Publishing, New Models and Opportunities, Proceedings of an ICCC/IFIP Conference, Apr. 14, 1997, pp. 237-249.

Gladney, H. M.: "Access Control for Large Collections", NY, vol. 15, No. 2, Apr. 1, 1997, pp. 154-194.

Henke, H. "Survey on Electronic Book Features", Open eBook Forum, online, Mar. 20, 2002, pp. 1-14, retrieved from the internet: <http://www.openebook.org/doc_library/surveys/IDPF_eBook_Features_2002.pdf> retrieved Nov. 8, 2010.

(56) References Cited

OTHER PUBLICATIONS

Ziviani, N ED, Baeza-Yates R. et at: "Modern Information Retrieval, Text Operations", Jan. 1, 1999, Modern Information Retrieval, ACM Press, NY, pp. 163-190.

Zobel, J. et al., "Inverted Files for Text Search Engines" ACM Computing Surveys, vol. 38, No. 2, Jul. 1, 2006, pp. 1-56, NY, NY.

"Annotation Engine," Berkman Center for Internet & Society at Harvard Law School <http://cyber.law .harvard. edulproj ectsl annotate.html> [Retrieved Jan. 30, 2004].

"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004].

"Annotator Wishlist," Berkman Center for Internet & Society at Harvard Law School r <http://cyber.law.harvard.edulcite/annotate.cgi ?action=print&markup ;center=; view=http%3A%2F%2Fcy . . . > [Retrieved Jan. 30, 2004].

Roscheisen, M., et al., "Beyond Browsing: Shared Comments, SOAPs, Trails, and On-Line Communities," Computer Networks and ISDN Systems 27:739-749, 1995.

Canadian Office Action mailed Apr. 14, 2009 for Canadian Patent Application No. 2594573, a counterpart foreign application of U.S. Appl. No. 11/039,645.

Chinese Office Action mailed May 9, 2008 for Chinese Patent Application No. 200680002606.2, a counterpart foreign application of U.S. Appl. No. 11/039,645.

Chinese Second Office Action mailed Jun. 5, 2009 for Chinese Patent Application No. 200680002606.2, a counterpart foreign application of U.S. Appl. No. 11/039,645.

Chinese Third Office Action mailed Nov. 27, 2009 for Chinese Patent Application No. 200680002606.2, a counterpart foreign application of U.S. Appl. No. 11/039,645.

Carter, S., et al., "Digital Graffiti: Public Annotation of Multimedia Content," Proceedings o/the CHI2004, Vienna, Austria, Apr. 24-29, 2004, pp. 1207-1210.

Extended European Search Report mailed Dec. 22, 2009, issued in corresponding European Patent Application No. EP 06 71 8773.2, filed Jan. 18, 2006.

European Office Action mailed Dec. 12, 2009 for European Patent Application No. 06718773.2, a counterpart foreign application of U.S. Appl. No. 11/039,645.

European Search report mailed Dec. 22, 2009 for European Patent Application No. 06718773.2, a counterpart foreign application of U.S. Appl. No. 11/039,645.

Office Action from the U.S. Patent and Trademark Office for U.S. Appl. No. 11/763,375, mailed Feb. 23, 2010, 15 pages.

Japanese Office Action mailed Jan. 25, 2011 for Japanese Patent Application No. 2007-552235, a counterpart foreign application of U.S. Appl. No. 11/039,645.

International Search Report mailed Sep. 9, 2008, in International Application No. PCT/US/08/64387, filed May 21, 2008, 1 page.

International Search Report mailed Aug. 15, 2008, in International Application No. PCT/US07/89105, filed Dec. 28, 2007, 2 pages.

International Search Report mailed Aug. 15, 2008, in corresponding International Application No. PCT/US08/57829, filed Mar. 21, 2008, 1 page.

International Search Report mailed Jul. 7, 2008, in International Application No. PCT/US08/57848, filed Mar. 31, 2008, 2 pages.

PCT International Search Report and the Written Opinion for Application No. PCT/US2006/001752, mailed on Jul. 27, 2006, 8 pgs.

"Say NO to Third Voice," Worldzone.net, 1999-2004, <http://worldzone.netiinternetipixelsnttv/index.html> [retrieved Jan. 30, 2004].

"The Berkman Center for Internet & Society at Harvard Law School: Annotation Engine," Harvard.Edu, 1999-2004, <http://cyber.iaw.harvard.eduJprojects/annotate.html> [Retrieved Jan. 30, 2004].

Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.

Kumar, A., "Third Voice Trails off . . . ," Wired News, 2004, <http://www.wired.comlnews/printlO. 1294,42803 ,00.html> [retrieved Jan. 30, 2004].

"A Universally Unique IDentifier (UUID) URN Namespace", Jul. 2005, IETF, all pages. Retrieved on Apr. 21, 2010 at http://tools.ietf.org/pdf/rfc4122.pdf.

Bellwood, et al., "UDDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm.

PCT Search Report for PCT Application No. PCT/US10/22060, mailed Mar. 8, 2010 (7 pages).

"Universal Unique Identifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm.

"Web Services Architecture: W3C Working Group Note Feb. 11, 2004", W3C, all pages. Retrieved on Apr. 21, 2010 via Wayback Machine at http://web.archive.org/web/20040402051 85/http://www.w3.org/TR/ws-arch/.

U.S. Appl. No. 11/277,894, filed Mar. 29, 2006, Jateen P. Parekh, Gregg E. Zehr, and Subram Narasimhan, "Reader Device Content Indexing".

U.S. Appl. No. 11/537,484, filed Sep. 29, 2006, Thomas Ryan, "Expedited Acquisition of a Digital Item Following a Sample Presentation of the Item."

U.S. Appl. No. 11/537,518, filed Sep. 29, 2006, John Lattyak, "Acquisition of an Item based on a Catalog Presentation of Items."

U.S. Appl. No. 11/693,685, filed Mar. 29, 2007, John Lattyak; John Kim; Steven Moy; Laurent An Minh Nguyen, "Relative Progress and Event Indicators."

U.S. Appl. No. 11/763,314, filed Jun. 14, 2007, John Lattyak; Craig Griffin; Steven Weiss, "Display Dependent Markup Language."

U.S. Appl. No. 11/763,339, filed Jun. 14, 2007, David Isbister; Marshall Willilams; Nicholas Vaccaro, "Power Management Techniques for a User Device."

U.S. Appl. No. 11/763,357, filed Jun. 14, 2007, James Reztlaff II; John Lattyak, "Obtaining and Verifying Search Indices."

U.S. Appl. No. 11/763,363, filed Jun. 14, 2007, James Reztlaff II; Thomas Ryan, "Search Results Generation and Sorting."

U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."

U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."

U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."

U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."

U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."

U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin "Providing User-Supplied Items to a User Device."

(56) References Cited

OTHER PUBLICATIONS

U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System."
U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin,, "Incremental Updates of Items."
U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System."
U.S. Appl. No. 11/963,618, filed Dec. 21, 2007, Michael Rykov; Laurent An Minh Nguyen; Steven Moy, "Dissemination of Periodical Samples."
U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."
U.S. Appl. No. 12/351,629, filed Jan. 9, 2009, John Johnston; Weiping Dou; Steven Chase, "Antenna Placement on Portable Device."
U.S. Appl. No. 12/351,663, filed Jan. 9, 2009, Chris Li; Steven Chase, "Surface Mount Clip for Routing and Grounding Cables."
U.S. Appl. No. 12/360,089, filed Jan. 26, 2009, Thomas Dimson; Janna Hamaker, Eugene Kalenkovich, Tom Killalea, "Aggregation of Highlights."
U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."
U.S. Appl. No. 12/366,941, filed Feb. 6, 2009, Scott Dixon; Eriel Thomas, "Bundled Digital Content."
U.S. Appl. No. 29/331,528, filed Jan. 27, 2009, Chris Green, "User Interface Cluster."
Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.
Cleveland, Jr. et al., "Questions and Answers about Biological Effects and Potential Hazards of Radiofrequency Electromagnetic Fields" OET Bulletin 56, Fourth Edition, Aug. 1999, 38 pages.
Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.
Elspass, et al., "Portable Haptic Interface with Active Functional Design", In Proceedings SPIE Conference on Smart Structures and Integrated Systems, Newport Beach, California, vol. 3668, Mar. 1999, 926-932.
"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.
Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.
Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.
Means, et al., "Evaluating Compliance with FCC Guidelines for Human Exposure to Radiofrequency Electromagnetic Fields", OET Bulletin 65 Edition 97-01, Jun. 2001, 57 pages.
Nakatani, et al., "3D Form Display with Shape Memory Alloy", In Proceedings of 13th International Conference on Artificial Reality and Teleexistence (ICAT), 2003, pp. 179-184.
OQO "A Full PC That Fits in Your Pocket" Retrieved on Sep. 22, 2008 at http://www.oqo.com/support/documentation.html>>.

"Shape Memory Polymer", retrieved on May 7, 2009 at <<http://en.wikipedia.org/wiki/Shape_Memory_Polymer>>, Wikipedia, 8 pgs.
Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.
Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.
The European Office Action mailed Mar. 26, 20010 for European Patent Application No. 06718773.2, a counterpart foreign application of U.S. Appl. No. 11/039,645.
Non-Final Office Action for U.S. Appl. No. 11/537,518, mailed on Apr. 28, 2011, John Lattyak, "Acquisition of an Item Based on a Catalog Presentation of Items".
Office action for U.S. Appl. No. 11/763,357, mailed on May 26, 2011, Reztlaff, "Obtaining and Verifying Search Indices".
Final Office Action for U.S. Appl. No. 11/763,314, mailed on Jun. 13, 2011, Craig S. Griffin, "Display Dependent Markup Language".
Non-Final Office Action for U.S. Appl. No. 11/693,682, mailed on Jun. 9, 2011, Hilliard B. Siegel, "Providing Annotations of a Digital Work".
PCT International Search Report and the Written Opinion for Application No. PCT/US 08/64389, mailed on Jan. 28, 2009, 7 pgs.
Desmoulins et al., "Pattern-Based Annotations on E-books: From Personal to Shared Didactic Content", Proceedings of the IEEE International Workshop on Wireless adn Mobile Techniques in Education, 2002, 4 pages.
Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.
Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>.
Cavanaugh "EBooks and Accommodations", Teaching Expectional Children vol. 35 No. 2 p. 56-61 Copyright 2002 CEC.
Chi et al. "eBooks with Indexes that Reorganize Conceptually", CHI2004, Apr. 24-29, 2004, Vienna, Austria ACM 1-58113-703-6/04/0004.
Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009.
Sohn et al. "Development of a Standard Format for eBooks", SAC2002, Madrid, Spain, 2002 ACM 1-58113-445-2/02/0.
Navarro, et al., "Modern Information Retrieval, Chapter 8: Indexing and Searching", Jan. 1, 1999, Modern Information Retrieval, ACM Press, New York, pp. 191-228.
BarnesandNoble.com, "Barnes and Noble Homepage", retrieved on Aug. 2, 2011 http://web.archive.org/web/19981202183957/http://www.barnesandnoble.com/, Dec. 2, 1998.
Chinese Office Action mailed Oct. 10, 2011 for Chinese patent application No. 200880017259.X, a counterpart foreign application of U.S. Appl. No. 11/693,682, 7 pages.
Chinese Office Action mailed Jul. 14, 2011 for Japanese patent application No. 20078004873.9, a counterpart foreign application of US patent No. 7,865,817, 6 pages.
Chinese Office Action mailed Aug. 25, 2011 for Chinese patent application No. 200880024964.2, a counterpart foreign application of U.S. Appl. No. 11/763,358, 6 pages.
Chinese Office Action mailed Sep. 26, 2011 for Chinese patent application No. 200880017589.9, a counterpart foreign application of U.S. Appl. No. 11/763,369, 9 pages.
Chinese Office Action mailed Sep. 30, 2011 for Chinese patent application No. 200880025056.5, a counterpart foreign application of U.S. Appl. No. 11/763,374, 9 pages.
Office action for U.S. Appl. No. 12/360,089, mailed on Oct. 5, 2011, Killalea et al., "Aggregation of Highlights", 75 pages.
Final Office Action for U.S. Appl. No. 11/763,392, mailed on Oct. 14, 2011, Thomas Ryan, "Administrative Tasks in a Media Consumption System ", 38 pages.

(56) References Cited

OTHER PUBLICATIONS

Office action for U.S. Appl. No. 11/763,390, mailed on Oct. 24, 2011, Bajaj et al., "Providing User-Supplied Items to a User Device ", 11 pages.
Office action for U.S. Appl. No. 12/333,215, mailed on Jul. 18, 2011, Zagorie et al., "Device-Specific sentation Control for Electronic Book Reader Devices", 22 pages.
Non-Final Office Action for U.S. Appl. No. 11/693,685, John Lattyak, "Relative Progress and Event Indicators".
Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.
Non-final Office Action for U.S. Appl. No. 11/763,363, mailed on Aug. 26, 2011, James R. Rezlaff II, "Search Results Generation and Sorting", 10 pages.
Non-Final Office Action for U.S. Appl. No. 11/763,358, mailed on Sep. 12, 2011, James R. Retzlaff II, "Managing Status of Search Index Generation", 11 pages.
Final Office Action for U.S. Appl. No. 11/963,618, mailed on Sep. 26, 2011, Michael Rykov, "Dissemination of Periodical Samples", 15 pages.
Non-Final Office Action for U.S. Appl. No. 11/763,374, mailed on Sep. 27, 2011, Thomas Ryan, "Consumption of Items via a User Device", 17 pages.
Chinese Office Action mailed Jun. 28, 2013 for Chinese patent application No. 20078004873.9, a counterpart foreign application of US patent application No. 7,865,817, 4 pages.
Chinese Office Action mailed Jul. 10, 2013 for Chinese patent application No. 200880025056.5, a counterpart foreign application of US Appl. No. 11/763,374, 8 pages.
European Office Action mailed Jun. 10, 2013 for European patent application No. 06718773.2, a counterpart foreign application of U.S. Appl. No. 11/693,682, 6 pages.
Japanese Office Action mailed May 24, 2013 for Japanese patent application No. 2010-501124, a counterpart foreign application of U.S. Appl. No. 11/693,682, 7 pages.
Japanese Office Action mailed May 31, 2013 for Japanese patent application No. 2010-509529, a counterpart foreign application of U.S. Appl. No. 11/763,374, 5 pages.
Office action for U.S. Appl. No. 12/360,089, mailed on Jul. 3, 2013, Killalea et al., "Aggregation of Highlights", 14 pages.
Chinese Office Action mailed Sep. 24, 2012 for Chinese patent application No. 200880017259.X, a counterpart foreign application of U.S. Appl. No. 11/693,682, 5 pages.
Japanese Office mailed Oct. 12, 2012 for Japanese patent application No. 2009-544304, a counterpart foreign application of US patent No. 7,865,817, 6 pages.
Japanese Office Action mailed Sep. 18, 2012 for Japanese patent application No. 2007-552235, a counterpart foreign application of US patent No. 8,131,647, 4 pages.
Office action for U.S. Appl. No. 11/763,374 mailed on Oct. 16, 2012, Ryan et al, "Consumption of Items via a User Device", 13 pages.
Office action for U.S. Appl. No. 13/083,445, mailed on Oct. 5, 2012, Siegel et al., "Method and System for Providing Annotations of a Digital Work", 29 pages.
Office action for U.S. Appl. No. 12/360,089, mailed on Nov. 23, 2012, Killalea et al., "Aggregation of Highlights", 15 pages.
Chinese Office Aciton mailed Feb. 1, 2013 for Chinese patent application No. 200880025056.5, a counterpart foreign application of U.S. Appl. No. 11/763,374, 19 pages.
Office action for U.S. Appl. No. 13/294,803, mailed on Feb. 21, 2013, Inventor #1, "Progress Indication For A Digital Work", 26 pages.
Office action for U.S. Appl. No. 11/763,386, mailed on Feb. 28, 2013, Ryan et al., "Handling of Subscription-Related Issues in a Media Consumption System", 17 pages.
Office action for U.S. Appl. No. 12/360,089, mailed on Mar. 5, 2013, Killalea et al., "Aggregation of Highlights", 17 pages.
Oki et al., "The Infomation Bus-An Architecture for Extensive Distributed Systems", ACM, 1993, 11 pages.
Palm Reader Handbook, Palm Inc., 2000, 56 pages.
Japanese Office Action mailed Oct. 25, 2011 for Japanese patent application No. 2007-552235, a counterpart foreign application of U.S. Appl. No. 11/039,645, 3 pages.
Mercier et al., "Sphere of influence Model in Information retrieval", IEEE 2005 International Conference on Fuzzy Systems, pp. 120-pp. 125.
Final Office Action for U.S. Appl. No. 11/537,484, mailed on Jan. 24, 2012, Thomas A. Ryan, "Expedited Acquisition of a Digital Item Following a Sample Presentation of the Item", 22 pages.
Final Office Action for U.S. Appl. No. 12/759,828, mailed on Nov. 10, 2011, James R. Retzalff II, "Search and Indexing on a User Device", 16 pages.
Final Office Action for U.S. Appl. No. 11/537,518, mailed on Nov. 25, 2011, John Lattyak, "Acquisition of an Item Based on a Catalog Presentation of Items," 8 pages.
Non-Final Office Action for U.S. Appl. No. 11/763,386, mailed on Nov. 8, 2011, Thomas Ryan, "Handling of Subscription-Related Issues in a Media Consumption System", 10 pages.
Non-Final Office Action for U.S. Appl. No. 11/763,395, Thomas Ryan, "Providing Supplemental Information Based on Hints in a Media Consumption System", 10 pages.
Office action for U.S. Appl. No. 11/763,357 , mailed on Dec. 21, 2011, Reztlaff et al., "Obtaining and Verifying Search Indices", 14 pages.
Final Office Action for U.S. Appl. No. 11/763,363, mailed on Dec. 23, 2011, James R. Rezlaff II et al., "Search Results Generation and Sorting", 10 pages.
Non-Final Office Action for U.S. Appl. No. 11/763,369, mailed on Dec. 29, 2011, James R. Reztlaff II et al., "Search of Multiple Content Sources on a User Device", 21 pages.
Final Office Action for U.S. Appl. No. 11/693,685, dated Dec. 8, 2011, John Lattyak et al., "Relative Progress and Event Indicators", 23 pages.
Final Office Action for U.S. Appl. No. 11/763,374, mailed on Feb. 13, 2012, Thomas Ryan et al., "Consumption of Items via a User Device", 14 pages.
Non-Final Office Action for U.S. Appl. No. 11/763,393, mailed on Feb. 16, 2012, John Lattyak et al., "Incremental Updates of Items ", 24 pages.
Final; Office Action for U.S. Appl. No. 12/360,089, mailed on Mar. 28, 2012, Tom Killalea et al., "Aggregation of Highlights", 17 pages.
Non-Final Office Action for U.S. Appl. No. 12/366,941, mailed on Mar. 30, 2012, Scott Dixon et al., "Bundled Digital Content", 12 pages.
US Pat. Pub. No. 2004081300 dated Apr. 29, 2004, corresponds to Japanese Patent Application Laid-open No. 2002-259718, 14 pages.
US Patent No. 7,340,436 dated Mar. 4, 2008, corresponds to Japanese Patent Application Laid-open No. 2003-513384, 7 pages.
Goodreads.com, "About goodreads", 2006, 2 pages.
Japanese Office Action mailed Apr. 12, 2013 for Japanese patent application No. 2010-501125, a counterpart foreign application of U.S. Appl. No. 11/763,369, 5 pages.
Office action for U.S. Appl. No. 11/763,374, mailed on Apr. 22, 2013, Ryan et al., "Consumption of Items via a User Device", 17 pages.
Office action for U.S. Appl. No. 11/763,390, mailed on Apr. 8, 2013, Bajaj et al, "Providing User-Supplied Items to a User Device", 7 pages.
Office action for U.S. Appl. No. 11/763,369, mailed on May 14, 2013, Reztlaff, II et al., "Search of Multiple Content Sources on a User Device", 24 pages.
Office action for U.S. Appl. No. 11/763,395, mailed on May 2, 2013,Ryan et al., "Providing Supplemental Information Based on Hints in a Media Consumption System", 12 pages.
Office action for U.S. Appl. No. 13/294,803, mailed on Jun. 4, 2013, Lattyak et al., "Progress Indication for a Digital Work", 26 pages.
Office action for U.S. Appl. No. 12/759,828, mailed on Jun. 6, 2013, Reztlaff, II et al., "Search and Indexing on a User Device", 27 pages.
International Search Report mailed Sep. 9, 2008, in International Application No. PCT/US08/64387, filed May 21, 2008, 1 page.
Chinese Office Action mailed Jun. 6, 2013 for Chinese patent application No. 201080006308.7, a counterpart foreign application of US patent No. 8,378,979, 13 pages.

(56) References Cited

OTHER PUBLICATIONS

Office action for U.S. Appl. No. 11/763,376, mailed on Aug. 19, 2013, Kiraly et al., "Notification of a User Device to Perform an Action", 16 pages.
Canadian Office Action mailed Jul. 6, 2012 for Canadian patent application No. 2594573, a counterpart foreign application of US patent application No. 8,131,647, 5 pages.
Final Office Action from the U.S. Patent and Trademark Office for U.S. Appl. No. 11/763,378, mailed on Mar. 16, 2010, 16 pgs.
Office Action from the U.S. Patent and Trademark Office for U.S. Appl. No. 11/763,375, mailed on Jan. 19, 2010, 31 pgs.
Office Action from the U.S. Patent and Trademark Office for U.S. Appl. No. 11/763,378, mailed on Oct. 15, 2009, 31 pgs.
Office Action from the U.S. Patent and Trademark Office for U.S. Appl. No. 11/763,375, mailed on Aug. 6, 2010, 17 pgs.
Office action for U.S. Appl. No. 11/763,390, mailed on Jun. 27, 2012, Bajaj et al., "Providing User-Supplied Items to a User Device", 7 pages.
Office action for U.S. Appl. No. 11/763,392, mailed on Jun. 27, 2012, Ryan et al., "Administrative Tasks in a Media Consumption System", 47 pages.
Office action for U.S. Appl. No. 11/693,682, mailed on Apr. 23, 2012, Siegel et al., "Providing Annotations of a Digital Work", 12 pages.
Final Office Action for U.S. Appl. No. 11/763,386, mailed on Apr. 26, 2012, Thomas Ryan et al., "Handling of Subscription-Related Issues in a Media Consumption System", 14 pages.
Non-Final Office Action for U.S. Appl. No. 13/083,445, mailed on May 4, 2012, Hilliard B. Siegel et al., "Method and System for Providing Annotations of a Digital Work", 20 pages.
Final Office Action for U.S. Appl. No. 11/763,395, mailed May 9, 2012, Thomas Ryan et al., "Providing Supplemental Information Based on Hints in a Media Consumption System", 12 pages.
Chinese Office Action mailed May 17, 2012 for Chinese patent application No. 20078004873.9, a counterpart foreign application of US patent No. 7,865,817, 5 pages.
Non-Final Office Action for U.S. Appl. No. 12/943,211, mailed on Jun. 6, 2012, James. R. Retzlaff II et al., "Obtaining and Verifying Search Indices", 10 pages.
Chinese Office Action mailed May 21, 2012 for Chinese patent application No. 200880017589.9, a counterpart foreign application of U.S. Appl. No. 11/763,369, 9 pages.
Non-Final Office Action for U.S. Appl. No. 11/763,369 mailed on Jun. 7, 2012, James R. Reztlaff II et al., "Search of Multiple Content Sources on a User Device", 20 pages.
Chinese Office Action mailed Dec. 13, 2012 for Chinese patent application No. 200780048783.9, a counterpart foreign application of US patent No. 7,865,817, 7 pages.
Chinese Office Action mailed Dec. 14, 2012 for Chinese patent application No. 200880017589.9, a counterpart foreign application of U.S. Appl. No. 11/763,369, 18 pages.
Japanese Office Action mailed Dec. 7, 2012 for Japanese patent application No. 2010-509529, a counterpart foreign application of U.S. Appl. No. 11/763,374, 7 pages.
Japanese Office Action mailed Dec. 7, 2012 for Japanese patent application No. 2010-501124, a counterpart foreign application of U.S. Appl. No. 11/693,682, 6 pages.
Office action for U.S. Appl. No. 12/943,211, mailed on Feb. 6, 2013, Reztlaff, II et al., "Obtaining and Verifying Search Indices", 9 pages.
Office action for U.S. Appl. No. 11/763,392, mailed on Feb. 14, 2013, Ryan et al., "Administrative Tasks in a Media Consumption System", 46 pages.
Chinese Office Action mailed Aug. 3, 2012 for Chinese patent application No. 200880025056.5, a counterpart foreign application of U.S. Appl. No. 11/763,374, 17 pages.

Office action for U.S. Appl. No. 11/693,685, mailed on Aug. 15, 2013, Lattyak et al., "Relative Progress and Event Indicators", 24 pages.
Chinese Office Action mailed Nov. 5, 2013 for Chinese patent application No. 200880025056.5, a counterpart foreign application of U.S. Appl. No. 11/763,374, 15 pages.
Final Office Action for U.S. Appl. No. 11/763,395, mailed on Oct. 30, 2013, Thomas A. Ryan, "Providing Supplemental Information Based on Hints in a Media Consumption System", 14 pages.
Japanese Office Action mailed Nov. 12, 2013 for Japanese patent application No. 2010-501125, a counterpart foreign application of U.S. Appl. No. 11/763,369, 9 pages.
Japanese Office Action mailed Aug. 23, 2013 for Japanese patent application No. 2009-544304, a counterpart foreign application of US patent No. 7,865,817, 4 pages.
"Mastering to Become a True Manager, Well-selected commands for an efficient event log management, Part 1," Windows Server World, vol. 9, No. 2, pp. 86-96, IDG Japan, Japan, Feb. 1, 2004.
Office action for U.S. Appl. No. 11/763,386, mailed on Oct. 16, 2013, Ryan et al., "Handling of Subscription-Related Issues in a Media Consumption System", 18 pages.
Office Action for U.S. Appl. No. 12/943,211, mailed on Oct. 8, 2013, "Obtaining and Verifying Search Indices", 9 pages.
Office Action for U.S. Appl. No. 12/759,828, mailed on Dec. 17, 2013, James R. Retzlaff II, "Search and Indexing on a User Device", 25 pages.
Office Action for U.S. Appl. No. 11/763,374, mailed on Dec. 24, 2013, Thomas A. Ryan, "Consumption of Items via a User Device", 16 pages.
Office action for U.S. Appl. No. 11/537,484, mailed on Aug. 27, 2013, Ryan, "Expedited Acquisition of a Digital Item Following a Sample Presentation of the Item", 13 pages.
Final Office Action for U.S. Appl. No. 11/763,369, mailed on Sep. 16, 2013, James R. Reztlaff II et al., "Search of Multiple Content Sources on a User Device", 23 pages.
Office Action for U.S. Appl. No. 13/294,803, mailed on Sep. 24, 2013, John Lattyak, "Progress Indication for a Digital Work", 27 pages.
Office action for U.S. Appl. No. 13/722,961, mailed on Sep. 5, 2013, Lattyak et al., "Delivery of Items for Consumption by a User Device", 6 pages.
Final Office Action for U.S. Appl. No. 12/360,089, mailed on Jan. 28, 2014, Tom Killalea, "Aggregation of Highlights", 14 pages.
Office Action for U.S. Appl. No. 13/722,961, mailed on Apr. 25, 2014, John Lattyak, "Delivery of Items for Consumption by a User Device", 4 pages.
Canadian Office Action mailed May 29, 2014 for Canadian patent application No. 2684580, a counterpart foreign application of U.S. Appl. No. 11/763,374, 3 pages.
European Office Action mailed Apr. 7, 2014 for European patent application No. 06718773.2, a counterpart foreign application of US patent No. 8,131,647, 7 pages.
Final Office Action for U.S. Appl. No. 11/763,374, mailed on May 14, 2014, Thomas A. Ryan, "Consumption of Items via a User Device", 21 pages.
Final Office Action for U.S. Appl. 12/759,828, mailed on May 2, 2014, James R. Retzlaff II, "Search and Indexing on a User Device", 27 pages.
Office Action for U.S. Appl. No. 13/959,589, mailed on Jun. 2, 2014, Thomas A. Ryan, "Administrative Tasks in a Media Consumption System", 24 pages.
Office action for U.S. Appl. No. 13/284,446, mailed on Jun. 24, 2014, Hansen, "Indicators for Navigating Digital Works", 19 pages.
Office Action for U.S. Appl. No. 12/949,115, mailed on Jun. 4, 2014, Thomas A. Ryan, "Invariant Referencing in Digital Works", 11 pages.

* cited by examiner

QUESTIONS ON HIGHLIGHTED PASSAGES

BACKGROUND

Electronic devices are increasingly being used to display digital works such as electronic books or other media content. Among these electronic devices are electronic book readers, cellular telephones, personal digital assistant (PDA), portable media players, tablet computers, netbooks, and the like. As the quantity of available electronic media content continues to grow, filtering and providing access to portions of the electronic media content considered relevant to users and communities of users has become more desirable. Such access may function as a community-driven reputation system for passages in the work, and may render information more easily available to the community and further encourage sales of electronic media content.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
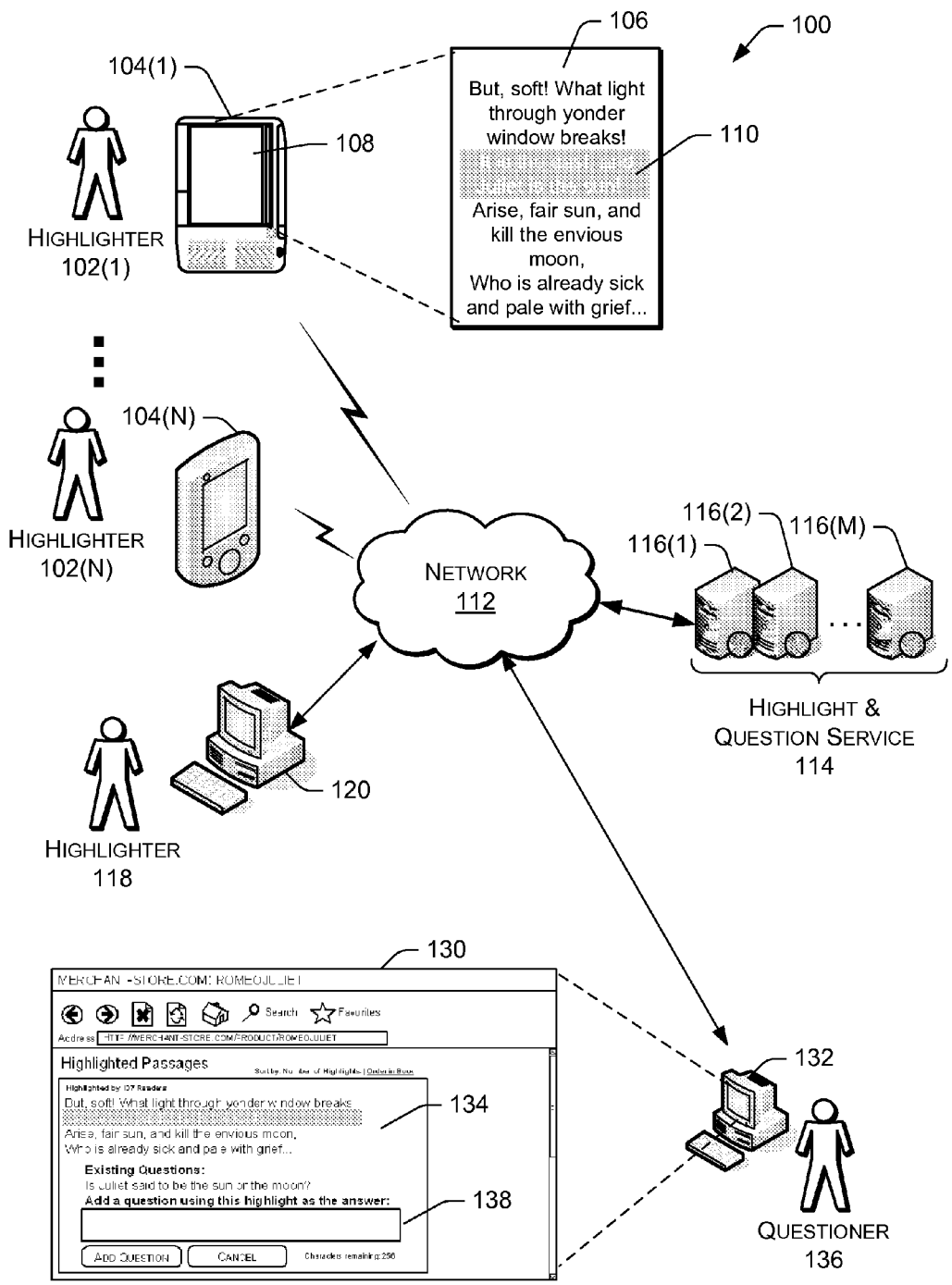
FIG. 1 illustrates an architecture in which user highlights of certain passages are aggregated and presented to enable formation of questions about particular highlighted passages.

This disclosure describes collection of highlighted passages excerpted from digital works and presentation of the highlights in a way that facilitates community questioning and discussion of the passages. Users may highlight portions or passages within a digital work using an electronic computing device. "Highlighting," as used herein, is the selection of a portion of a digital work, considered to be of interest or relevance by a user. For instance, a reader may choose to highlight an excerpt from an electronic book (or "eBook") displayed on an electronic device, such as a computer, portable digital assistant (PDA), or an electronic book reader device (or "eBook reader"). Alternatively, a music enthusiast may elect to highlight a part of a song or other audio work being played on an electronic device. In addition to user selection, highlights may be created automatically by monitoring usage characteristics (e.g., time spent on a particular portion), physical highlights taken from a scanned physical document, measureable features of music, action sequences of movie scenes, and so forth.

Questions may then be posed regarding the highlighted passages. The highlights and questions may be entered by the same person or entirely different people. In one case, the questions may be entered by the person who highlights a passage. That individual highlights a passage and then crafts a question pertaining to the highlighted passage. Alternatively, one person may highlight a passage while another person may subsequently enter a question about the highlighted passage. The two people may be entirely unrelated, and may not know one another. Moreover, questions may be entered first (e.g., by a teacher) in a way that begs another person (e.g., a student) to highlight a corresponding passage.

A user interface may be provided to enable a person to add one or more questions about the passage. The questions may be crafted in any number of formats, such as multiple choice, true/false, and open ended questions. The questions are associated with the highlights.

In some instances, highlights from multiple users may be aggregated, leading to a "Wisdom of Crowds" effect where passages highlighted by many may be considered more relevant or useful than passages highlighted by a small number of users. The aggregated highlights and any corresponding questions are then made available to a community of users. The community includes not only those who created the highlights and questions, but other observers as well. These users may also elect to enter questions about the highlighted portions. Discussion forums may further be provided to facilitate community discussion of the highlights and questions.

Also, the architecture described herein facilitates discovery of answers to the questions. There are many implementations, including allowing users to enter answers, automatically parsing the questions and searching for answers, and submitting the questions to a mechanical solution network.

For discussion purposes, highlight aggregation and questioning is described in the context of highlighting textual content, such as excerpts from an eBook or electronic magazine. However, the concepts described herein are also applicable to highlighting portions of other digital works, such as audio recordings, video recordings, pictures, or the like.

Architectural Environment

FIG. 1 illustrates an example architecture 100 in which highlighting of passages and production of questions pertaining to the highlighted passages may be implemented. As shown, there are many users, some of whom highlight portions of digital works (eBooks, digital magazines, etc.), others of whom review or even purchase highlights, and still others whom ask questions pertaining to the highlights. A user who adds highlights to a digital work is referred to as a "highlighter." Several highlighters 102(1), . . . , 102(N) are illustrated in FIG. 1. Each highlighter 102 may highlight his or her respective copy of a digital work, or a commonly accessible single copy, via an electronic device capable of rendering, playing, or otherwise presenting the digital work. As shown, each highlighter 102(1)-(N) employs a corresponding electronic device 104(1), . . . , 104(N), including an eBook reader device 104(1) and a portable digital assistant (PDA) 104(N). While an eBook reader device and PDA are illustrated, digital works may be displayed and highlighted using other electronic devices, such as cellular telephones, portable media players, tablet computers, netbooks, notebooks, desktop computers, and the like.

Each electronic device 104(1)-(N) provides controls (e.g., hardware and/or software controls) that enable the corresponding user 102(1)-(N) to highlight passages of the digital work. In the illustrated environment, the user 102(1) is able to highlight a passage of an eBook being presented on the eBook reader 104(1). Here, the digital work is an eBook version of William Shakespeare's classic, *Romeo & Juliet*, and a portion of the eBook 106 is presented on the device's display 108. Moved by the famous passage—"But, soft! What light through yonder window breaks! It is the east, and Juliet is the sun!"—the user decides to highlight the last sentence, as illustrated as highlighted passage 110.

The electronic reader devices 104(1)-(N) communicate via a network 112 to send the highlights to a service 114, where the highlights are stored in association with the digital works. The service 114 may optionally aggregate the highlights entered by various highlighters. Further, the service 114 allows the same or other users to pose questions about the highlights. In FIG. 1, the highlight and question service 114 is hosted on servers 116(1), . . . , 116(M), which receive the highlights added by the users 102(1)-(N) via their electronic reader devices 104(1)-(N). The servers 116(1)-(M) have processing and storage capabilities to store and optionally aggregate the highlights. The servers 116 may be embodied in any number of ways, including as a single server, a cluster of servers, a server farm or data center, and so forth, although other server architectures (e.g., mainframe) may also be used. The network 112 is representative of any one or combination of multiple different types of networks, such as the Internet, cable networks, wireless networks, and wired networks.

Additionally or alternatively, a highlighter 118 may use a computing device 120 to highlight a digital work. The computing device 120 may be implemented as any number of computing devices (mobile or stationary) that can access the servers 116 via the network 112, including, for example, a personal computer, a laptop computer, PDA, a cell phone, a set-top box, a game console, and so forth. The computing device 120 is equipped with one or more processors and memory to store applications and data. The computing device 120 executes an application (e.g., browser, reader application, etc.) that displays digital works, and facilitates user highlighting of those digital works as well as transmission of the highlights to the servers 116 of the highlight and question service 114. In one implementation, the highlighter 118 may have access rights to the digital work being highlighted, but may or may not have possessory rights. For example, a patron in a library may be permitted to highlight a digital work, but not access the digital work from their home.

Any highlights entered by the highlighters 102(A)-(N) and 118 are submitted to, and consolidated at, the highlight and question service 114. At the service 114, the servers 116(1)-(M) may perform other processing on the highlights. For instance, in one implementation, minimum and/or maximum lengths for individual highlights or other thresholds are predetermined or dynamically adjusted. For example, non-fiction programming books might have a minimum highlight length greater than that of a fiction work. Thresholds may also be determined on the fly, taking into account some book-specific heuristics. For example, a book with a low Flesch-Kincaid readability score may have a minimum highlight length set lower than a work with a high Flesch-Kincaid readability score. Where multiple versions or editions of a book are highlighted, highlights may be synchronized across versions.

The servers 116(1)-(M) may optionally determine the most commonly highlighted sections of the digital work and selects aggregated highlights corresponding to those sections according to one or more selection rules. The server(s) 114 may create a public version of aggregated highlights for a digital work and/or a purchase version. For example, the purchase version may be available for some remuneration, and provide more extensive or lengthy highlights than the public version. For instance, prospective customers or current licensees of a digital work may view the public version of the aggregated highlights to determine if a digital work is indeed what they wish to purchase. Likewise, a user with a license to consume a digital work may purchase the aggregated highlights. To protect rights of a digital work's owner, a maximum threshold for the quantity of a digital work displayed as aggregated highlights may be set.

Once collected, the highlighted passages are formatted for distribution to users. The highlights may be freely distributed to the public or packaged for sale to a group of users who wish to purchase them. In one implementation, a highlight and question user interface visually presents the highlights to a user on an electronic device. In the example illustration of FIG. 1, the highlights are presented in the highlight and question user interface (HQUI) 130 presented on a computing device 132. The HQUI 130 shows the highlighted passage 134 from *Romeo & Juliet* that was entered by the user 102(1) on eBook device 104(1).

The HQUI 130 may indicate highlights and their relative ranking, for example, using different orders, colors, and/or intensities of color. Highlights may be displayed as a graph, with the relative height of each bar indicating a frequency for each elementary interval in the digital work. For example, the graph may be bar, line, or histogram style. A user may navigate through the digital work by selecting aggregated highlights presented in the HQUI. In addition to the aggregated highlights, the HQUI may present highlights entered by the user of the electronic device. The HQUI could also present highlights entered by other users who either have a particular role or significance (e.g., the author) or who have a particular relationship to the user. Statistics comparing the user's highlights with those of other users or communities may also be presented. For example, a user may see that a portion they have highlighted was also highlighted by 80% of the members of a community.

The HQUI 130 also allows users to enter questions pertaining to the highlighted passages. As shown, a questioner 136 may enter questions within a question entry area 138. The questions may be crafted in any number of formats, such as multiple choice, true/false, and open ended questions. The questions are sent to the highlights and question service 114, where they are stored on the servers 116(1)-(M) and correlated with the highlighted passages and works from which they are derived. In one implementation, the service 114 tracks the time difference between when a passage was highlighted and when a question was asked about the highlighted passage.

As questions are added, the questions may also be presented along with the highlighted passages to future reviewers. For instance, the questions may be presented in the HQUI 130. One example of the HQUI 130 is described below in more detail with reference to FIGS. 4-8. It is further noted that although the HQUI 130 is shown implemented in a browser, other versions of a highlight and question UI may be provided for other devices, such as devices 104(1)-(N). An example of another HQUI designed for an eBook reader is described below in more detail with reference to FIGS. 9-11.

Once entered, the questions may be presented to other people in an open or controlled forum. For instance, one or more people may review and edit the questions for accuracy or typos. In another implementation, the questions may be exposed to a community of users who vote on the questions, thereby allowing the community to rank or rate the questions.

In the above discussion, questions are entered for passages that were previously highlighted. In other implementations, however, this order may be reversed. That is, the system architecture also facilitates identification and highlighting of passages in response to questions. For instance, suppose that a tester (e.g., teacher, professor, examination facilitator, trivia game site, etc.) authors a set of questions for a digital work. These questions may be provided, along with the digital work, to one or more test takers on a reading device, such as an eBook reader. During the testing period, the test taker (e.g., student, exam respondent, game participant, etc.) is asked to find and highlight the portions of the digital work that correspond to the questions. For instance, the tester may pose the question, "Identify a passage where a celestial body is used as a metaphor for Juliet." In response, the test taker may highlight the passage 110 of the digital work *Romeo & Juliet*.

Figure 2:
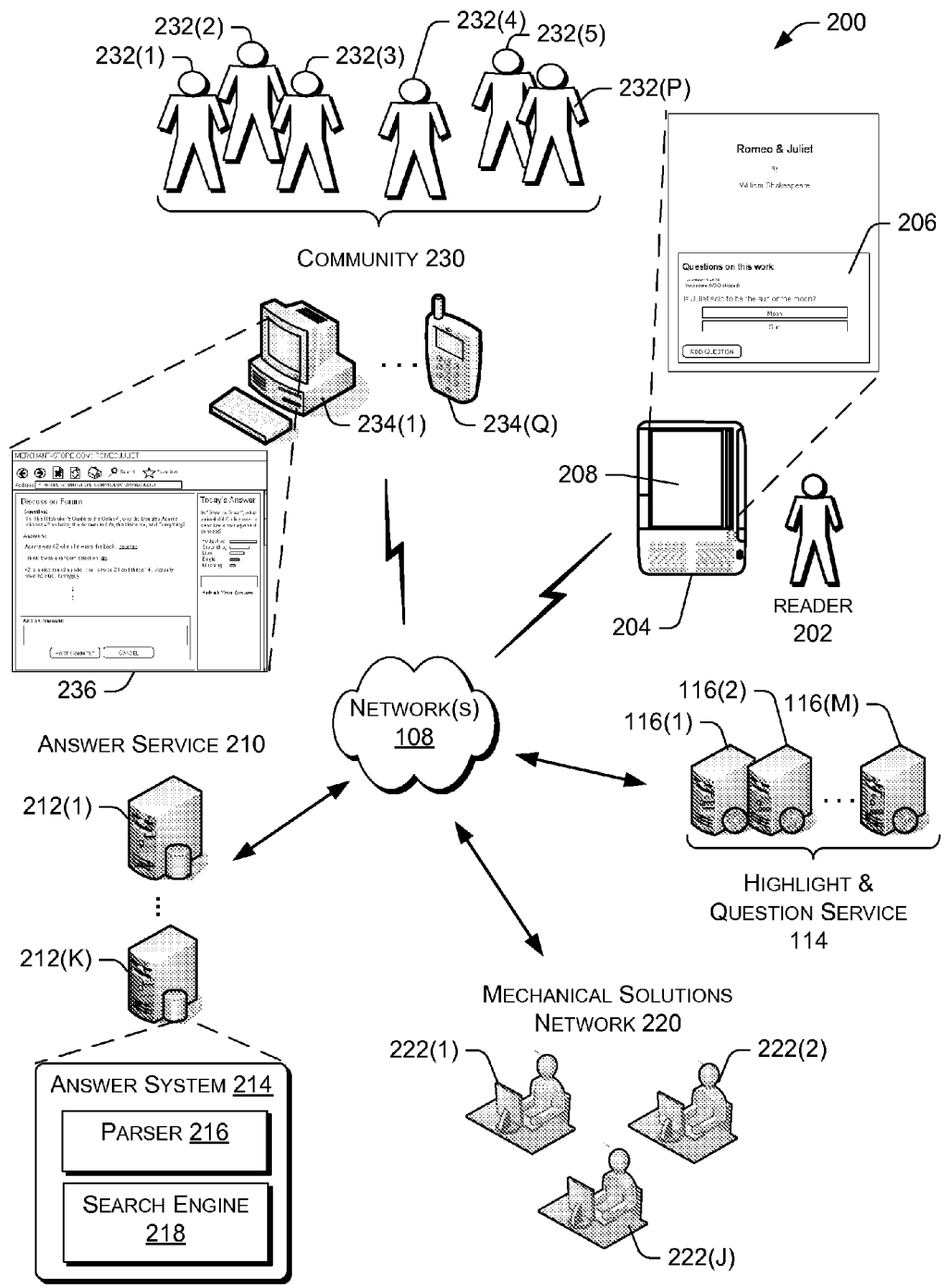
FIG. 2 illustrates an architecture in which answers to the questions about the particular highlighted passages may be discovered.

FIG. 2 illustrates an example architecture 200 in which answers or solutions pertaining to the highlight questions are discovered or discussed. In architecture 200, the highlight and question service 114 taps internal and external resources in an attempt to find answers to the questions posed by the users. In one approach, the servers 116(1)-(M) facilitate user entry of answers via the highlight and question user interface presented on an eBook reader or other client device. The servers 116(1)-(M) distribute the highlighted passages and questions to the user devices where they are associated with the corresponding digital works. When reading a work, the users can answer the questions, which may be structured in various formats, such as multiple choice, true/false, or open ended. In this illustration, a reader 202 uses her eBook device 204 to answer questions about the work, *Romeo & Juliet*. The eBook device 204 presents a user interface 206 on the display screen 208 and enables the reader 202 to enter answers to the questions.

In another approach, the servers 116(1)-(M) may send the questions to an answer service 210 that attempts to find answers using automated programmatic techniques. In this illustration, an answer service 210 is hosted on servers 212(1), . . . , 212(K). An answer system 214 is implemented on the servers 212(1)-(K) to receive and process questions. The answer system 214 has a parser 216 to parse the questions and/or highlighted passages to identify key words and phrases. The answer system 214 further includes a search engine 218 that conducts electronic online searches based on the key words and phrases extracted by the parser 216. Any information returned by the search engine 218 may then be processed to order the information based on relevance or other metrics. This information may then be returned to the servers 116(1)-(M). While the answer service 210 is illustrated as being independent from the highlight and question service 114, the two services may be integrated with one another and operated on the same server clusters.

Answers may also be discovered using a mechanical solutions network 220 that utilizes human resources to find answers to questions. As shown here, the mechanical solutions network 220 provides a computer system that sources search projects with various researchers 222(1), 222(2), . . . , 222(J). The researchers 222(1)-(J) use various means to uncover answers to the questions. For instance, suppose a reader of the William Shakespeare work, *Romeo & Juliet*, poses the question, "Where did Shakespeare live?" This question may be submitted to the mechanical solutions network 220, where one of the researchers 222 finds the answer and returns it promptly, along with any additional information. Examples of possible mechanical solutions network 220 include Amazon's Mechanical Turk™ system and mobile texting services, such as the service provided by ChaCha Search Inc. of Indianapolis, Ind.

Additionally, questions could be posted for consideration by a community of users. In FIG. 2, a community 230 has multiple members 232(1)-(P). Each member has access to a computing device, such as devices 234(1)-(Q). The questions received by the highlight and question service 114 may be served to the community members 232(1)-(P) by pushing the questions and highlighted passages to the community. Community members may register with the service 114 to receive questions pertaining to a particular work, or when highlighted passages relevant to a particular subject are identified. The questions and highlighted passages may be provided to the members via email or by sending some form of notification to access the service and review the questions. Alternatively, the members 232(1)-(P) may access the highlight and question service 114 at their leisure to view various highlighted passages and corresponding questions.

In either case, the highlight and question service 114 may host a web service that serves web pages to the various computing devices 234(1)-Q) used by the community members 232(1)-(P). The web pages function as a user interface 236 to facilitate community review, discussion, and answering of questions. The community UI 236 may be integrated with the HQUI 130 discussed above, or be an entirely separate and distinct UI. The community UI 236 may be implemented in many different ways and using any number of formats. As an example, the community UI 236 may include an answer entry area that allows community members to enter answers to questions about the highlighted passages. The UI 236 may further include discussion forums that support online discussions about a question and various answers. The UI 236 may further support social networking functions for the community members, since they are interested in similar digital works. An example of the community UI 236 is described below in more detail with reference to FIG. 12.

In one implementation, questions may be submitted to the community as a whole for their answers. The highlight and question service 114 may then track the answers from the community members and compute statistics. For instance, suppose a reader entered the question, "Where was William Shakespeare born?" This question could be submitted to the community 230, where members 232(1)-(P) have the opportunity to respond with answers. After some period of time, the service 114 finds that 73% of the community answered with "Stratford-Upon-Avon, in Warwickshire, England", which is the historically correct answer as verified by an independent source. However, the next two highest ranking answers were "Lancashire" with 16% of the community population and "London" with 5%. It is noted that certain questions may not have certifiable correctness, and the statistics merely suggest the answers most often given by the crowd.

In another implementation, the service 114 may post open questions for discussion and debate in an online discussion format. Community members may review the questions and post answers or comments. Other members may then comment on others postings. As an example, suppose a reader of Douglas Adams' "The Hitchhiker's Guide to the Galaxy" highlights a passage pertaining to "42" being the Answer to Life, the Universe, and Everything that was computed by the supercomputer Deep Thought. The reader then adds the question, "Why did Adams choose 42?" This question is received by the highlight and question service 114 and submitted to the community 230 as an open ended question in a discussion forum. The community members 232(1)-(P) may then debate the question in this forum. Since there may be no right answer, this format provides a very good way for the original reader to gain a deeper understanding of her question.

The highlight and question service 114 may also track response time, a time duration from the time the user is presented with a question until the time the user enters an answer. This feature may be used, for instance, when administering an exam or when comparing users in a reputation system. The service 114 may present a question pertaining to a highlighted passage, and then monitor how long it takes for the user to enter an answer. These metrics may then be tracked and provided as feedback to the user or may contribute to score in a game or be used to affect the user's rating in a reputation system.

In the above discussion, the questions and answers have been described as being textual in nature, where questions and answers are written and displayed. In some implementations, however, the devices for text-based digital work may include a text-to-speech feature that converts the text into an audible form, whereby the device effectively reads the text to the user. In such situations, the questions and answers may be presented in an audible form as well.

Exemplary System

Figure 3:
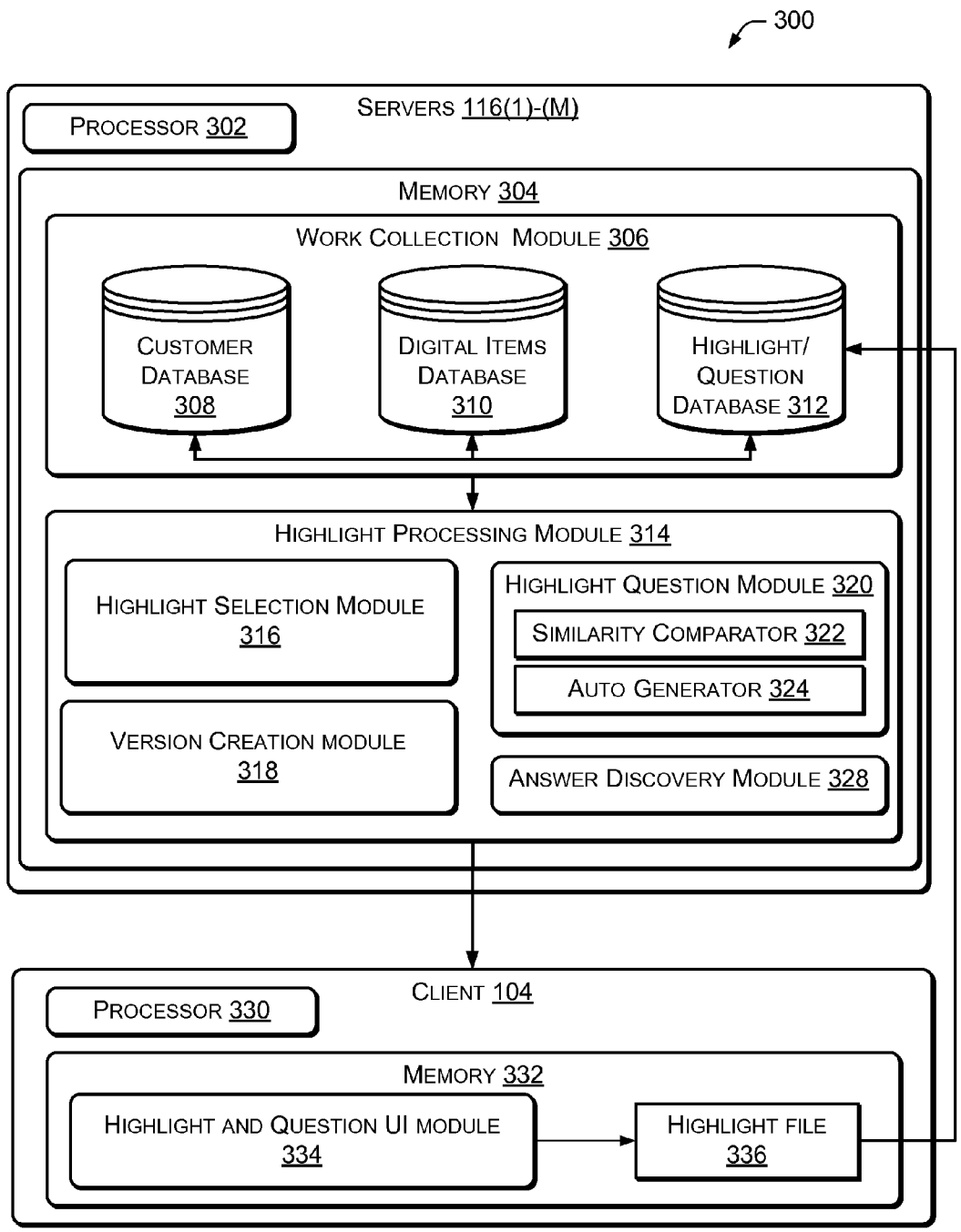
FIG. 3 is a block diagram illustrating selected modules in a computing system that implement aggregation of highlighted passages and question production of the highlighted passages.

FIG. 3 shows selected modules in a representative computer system 300 that may be used to implement aggregation of highlighted passages and production of questions pertaining to the highlighted passages. The system 300 includes the servers 116(1)-(M) of the highlight and question service 114 and the electronic devices, as represented by a client 104. The servers 116(1)-(M) collectively provide processing capabilities 302 and memory 304. The memory 304 may include volatile and nonvolatile memory, removable and non-removable media implemented in any type or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Stored in the memory 304 is a digital work collection module 306, which defines multiple databases. In this example, the digital work collection module 306 includes a customer database 308, a digital items database 310, and a highlight/question database 312. The customer database 308 contains information about users participating in the community. The digital items database 310 maintains the digital works themselves, such as music, books, movies, and so on. Digital works may be accessed in common. That is, each user with access to a particular work may access a common copy of that item, or each user may access her own discrete copy of an item stored in a digital locker. The highlight/question database 312 stores the highlights captured by the users and any questions directed to the highlighted passages. The highlights and questions are associated with the digital work through the data structure maintained in the highlight/question database 312. In one implementation, highlights are stored as intervals of a digital work, with beginning and end points, along with a version or edition number of the digital work for which the highlights are recorded.

A highlight processing module 314 is also present within memory 304 and functionally communicates with the digital work collection module 306. The highlight processing module 314 processes highlights received from the various users or highlighters 102(1)-(N) and 118 to create versions of aggregated highlights for presentation to the users. The highlight processing module 314 includes, in this implementation, a highlight selection module 316 to receive and process the various highlights submitted by the users. In one implementation, the highlight processing module 316 reconciles highlights across multiple versions of a digital work, when they are present. Reconciliation may include synchronization of versions and consolidating the synchronized highlights. To aid synchronization of versions, a reference database (not shown) is provided that includes the multiple versions of the digital work, including a reference version of a digital work (e.g., first edition of a book). Internal reference points (e.g., chapter headings or individual words in an electronic book) may be used to align the multiple versions. Reconciliation may take place on a per-highlight basis. For example, if the contents of one highlight matches another highlight, the two may be reconciled as equivalent. Highlights may also be reconciled using statistically improbable phrases.

Highlight selection rules are applied to the available highlights to create selected highlights. Examples of highlight selection rules include simple elimination, truncation elimination, elementary interval accretion, or an elimination/elementary interval hybrid process. These highlight selection rules may be used separately or combined. Highlights may encompass more than the portion of the digital work of interest to the user. In an electronic book, for example, the eBook reader or other display device may constrain the user to highlight only entire lines of displayed text, rather than individual characters or words. Thus, a user may select more than the desired text when highlighting a phrase beginning in the middle of one highlighted line and ending in the middle of the next highlighted line. In this example, the resulting highlight incorporates the end of an earlier phrase and the beginning of the following phrase, which may not be relevant to the user. Where desired, a phrase breaking or detection process may be used to provide context comprising adjacent text preceding and/or following highlighted text. Thus, a phrase breaking or detection process may strip out the incomplete phrases, leaving the modified highlight for further processing. Alternatively, the processing could provide the remainder of the phrase before and of the phrase after, and could optionally indicate for example through display mechanisms which part was included in the highlight and which was in the preceding phrase. The mechanisms for such a display could include but are not limited to hyperlinked ellipses, arrows, or text of different color or different background.

A phrase breaking or detection process may look to punctuation, spacing, capitalization, or a dictionary of words, etc. to determine when a phrase ends in an electronic book. Digital works comprising other formats, such as audio or video may incorporate a portion breaking or detection process using silence in an audio track, changes between video frames, metadata markers in the digital work, etc. to determine when a particular portion ends.

A more detailed discussion of highlights is provided in the co-pending application Ser. No. 12/360,089, which is titled "Aggregation of Highlights", which was filed on Jan. 26, 2009. This application is hereby incorporated by reference.

The selected highlights are produced and may be stored, displayed to a user, or used in other ways. In some implementations, the highlight selection rules may incorporate filters to remove attribution information of a particular highlight to a particular user, remove highlights which are not made by a minimum threshold of users, and so forth. However, highlights from a specially defined user, for example an author of a digital work, a professor or other educator, celebrity, etc, may be incorporated into highlights ultimately presented to the community, or viewed as separate highlights. A user may then toggle or otherwise select to view her own personal highlights, community highlights, highlights from the specially defined user, from other users who have read similar books, from others in the same geographic area, etc., or combinations thereof.

Highlights may also have contextual information, or context. Context may include, for example, portions of a work before and/or after selected highlights. For instance, where the digital work is an electronic book, context may be sentences immediately before and after the highlight. These sentences are added to the highlighted portion to create highlights with context.

The highlight processing module 314 has a version creation module 318 to create different versions of the aggregated highlights, such as a public version and a purchase version. The highlight processing module 314 further includes a highlight question module 320 that facilitates user entry and/or automatic generation of questions for highlighted passages. In one implementation, the highlight question module 320 allows users to ask questions about sections they highlighted or about highlights offered by others. The questions may be of any type, including true/false, multiple choice, fill-in-the-blank, essay, and open ended discussion. The highlight question module 320 includes a similarity comparator 322 that evaluates questions entered by the various users to filter out similar or identical questions. The comparator 322 compares each new question with previous questions pertaining to the same highlighted passages that are already stored in the highlight/question 312. The similarity comparator 322 may be tuned to different sensitivity levels of similarity. Further, the similarity comparator 322 may use raw word/phrase comparisons or more sophisticated linguistic approaches. For instance, in one implementation, the similarity comparator 322 may deem two multi-word questions similar if the differ by at most one word. Alternatively, the similarity comparator may implement linguistic engines that parse the questions and attempt to determine whether they have the same intended meaning.

The highlight question module 320 may further include an auto generator 324 that automatically generates questions pertaining to the highlights of a digital work. The auto generator 324 determines commonly highlighted passages in the digital work, and automatically generates questions from those passages. For instance, suppose the highlighted passage is, "It is the east, and Juliet is the sun!" The auto generator 324 may parse this statement, and pose the question "What celestial body is used as a metaphor for Juliet?"

The highlight processing module 314 further includes an answer discovery module 328 that facilitates the discovery of answers for the questions. Once questions are added to the highlighted passages, the answer discovery module 328 provides a variety of possible ways to uncover potential answers to the questions. In one implementation, the answer module 328 simply provides an interface to permit user entry of answers. In another implementation, the answer module 328 provides an automated, programmatic approach to parsing the questions and searching keywords from the question in an effort to find relevant answers. This implementation is represented by the example answer service 210 in FIG. 2. In still another implementation, the answer module 328 builds a query for submission to a mechanical solutions network (e.g., network 220), where humans conduct research and provide the answers to the questions.

The servers 116(1)-(M) communicate with one or more devices 104(1)-(N) and 118, as represented as client 104 in FIG. 3. Client 104 has a processor 330 and memory 332 (e.g., volatile, non-volatile, etc.). In the illustrated implementation, a highlight and question user interface (HQUI) module 334 is stored in the memory 332 and executed on the processor 330. The HQUI module 334 presents the aggregated highlights to the client user. The client user may further wish to submit highlights to the servers 116(1)-(M) for inclusion in the highlight database 312. When a user highlights a portion, a highlight file 336 is created and passed to the servers 116(1)-(M), where it is stored in the highlight/question database 312.

While the HQUI module 334 is shown residing on the client 104, it may also reside on the server and be provided to the client 104 as a web page that can be rendered by a browser or other rendering program.

Example HQUI

FIGS. 4-8 show a series of screen renderings of an exemplary highlight and question user interface (HQUI) 400 that facilitates user entry of questions pertaining to passages of digital works that have been highlighted. In this example series, the screen renderings are illustrated as web pages rendered within a browser. However, this is merely one possible implementation, and other technologies may be employed to facilitate electronic user entry of questions.

Figure 4:
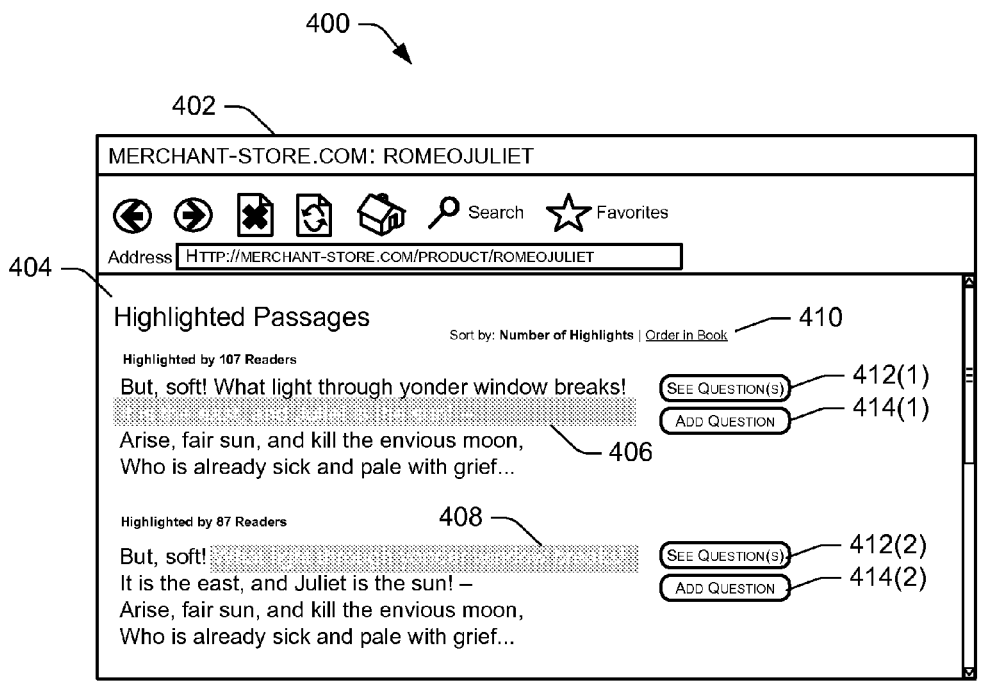
FIG. 4 illustrates a screen rendering of an exemplary user interface for showing highlighted passages from a digital work.

FIG. 4 shows a first screen rendering 402 of the HQUI 400, which has a highlighted passages area 404 that lists highlights previously entered by various readers. Here, the highlighted passages are from the Shakespeare's work, *Romeo & Juliet*. Two highlights 406 and 408 are shown in the area 404, with the first highlight 406 being to the phrase, "It is the east, and Juliet is the sun!" and the second highlight 408 direct to the phrase, "What light through yonder window breaks!" The highlights 406 and 408 may be arranged in any number of ways. In this illustration, the HQUI sorts the list of highlights according to two different criteria: (1) number of times the passage has been highlighted, and (2) order in which they appear in the digital work. The HQUI 400 may provide a sorting control 410 that allows the user to elect how the highlighted passages are ordered. In this illustration, the highlights are sorted according to the number of times the passage has been highlighted. The top highlighted passage 406 has been highlighted by 107 readers, whereas the second highlighted passage 408 has been highlighted by 87 readers.

For each highlighted passage 406 and 408, a set of controls are provided to enable the user to see questions posed for the highlighted passages and/or to add his own question. In this example, "See Question" controls 412(1) and 412(2) allow the user to see questions pertaining to the first and second highlights 406 and 408, respectively. "Add Question" controls 414(1) and 414(2) permit the user to add questions for the corresponding highlights 408 and 408.

Figure 5:
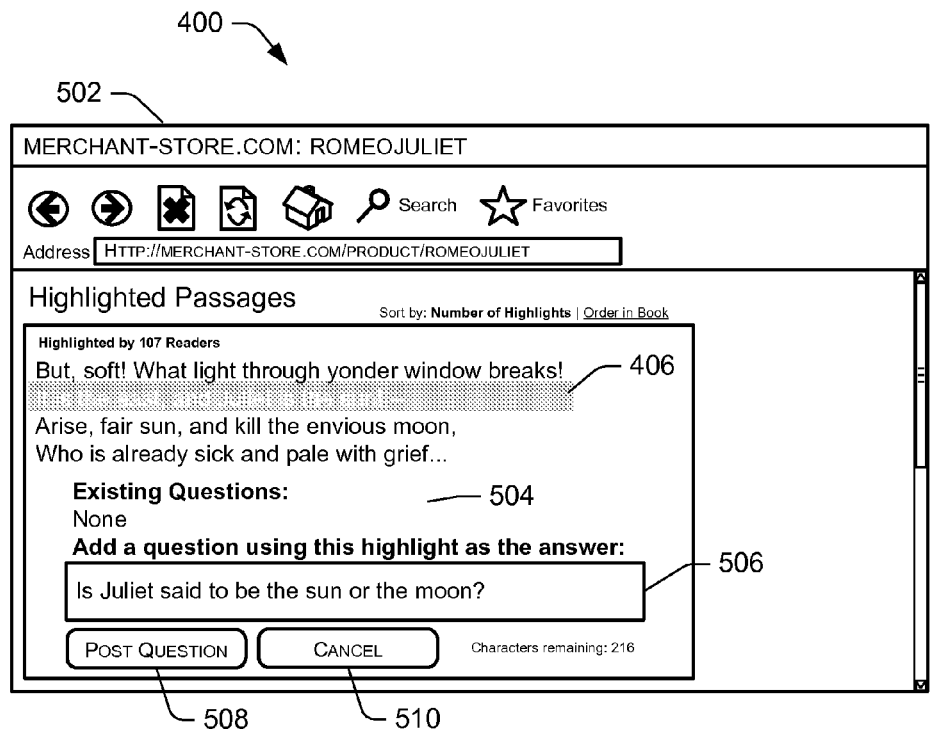
FIG. 5 illustrates a screen rendering of an exemplary user interface for enabling a user to enter a question pertaining to a highlighted passage.

FIG. 5 shows a second screen rendering 502 of the HQUI 400 that is presented in response to the user activating the "Add Question" control 414(1) associated with the highlighted passage 406 (FIG. 4). The highlighted passage 406 is restated and any existing questions are listed below the highlighted passage, at 504. In this example, there are no previous questions, and hence the description "None" is used. A question entry panel 506 allows the user to enter a new question for this highlighted passage from *Romeo & Juliet*. In this example, the user enters the question, "Is Juliet said to be the sun or the moon?" into the entry panel 506. The HQUI 400 provides a "Post Question" control 508 to allow the user to post the question once he has completed drafting it in the entry panel 506. Upon user activation of the "Post Question" control 508, the question is associated with the highlighted passage 406 and the work, *Romeo & Juliet*, and returned to the highlight and question service 114. If the user elects not to post the question, a "Cancel" control 510 is also provided to permit the user to withdraw the question.

Over time, more and more users enter questions to various highlighted passages. These questions are collected and stored at the servers 116(1)-(M) in association with the passages and digital works (e.g., in the highlights/questions database 312). The users may be asked to identify themselves when submitting questions, or that information may be discerned automatically, or the user may elect to submit questions anonymously.

Eventually, other users may wish to see questions and attempt to answer them. The users may be doing so simply out of enjoyment, self challenge, or as part of a formal educational process where the teacher is using the architecture of FIGS. 1 and 2 to assess students.

Figure 6:
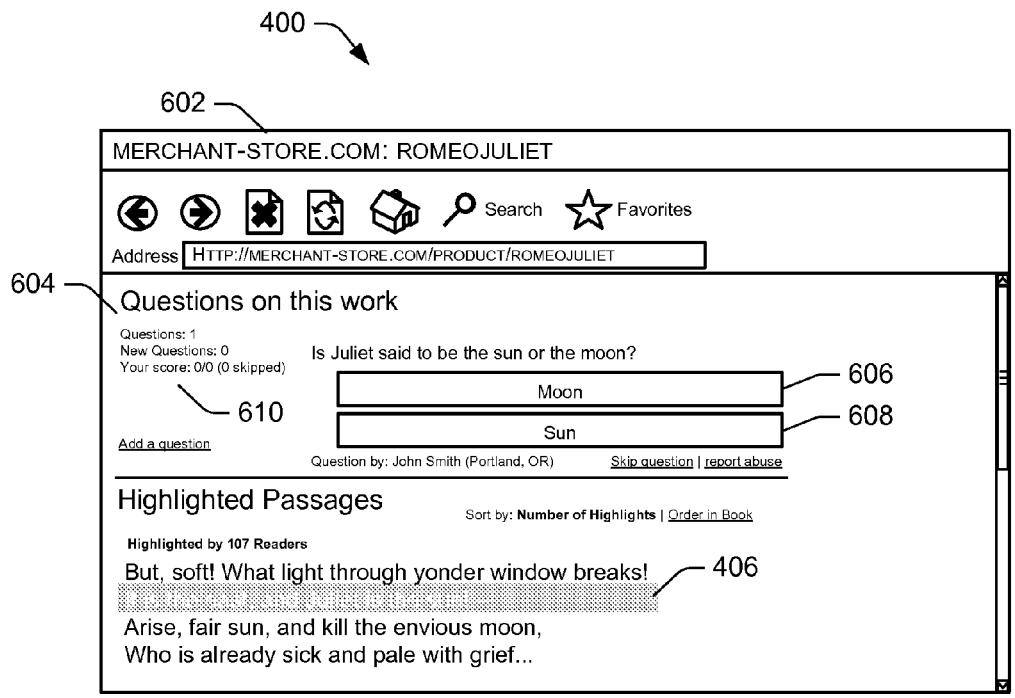
FIG. 6 illustrates a screen rendering of an exemplary user interface for quizzing a user with a question about a highlighted passage.

FIG. 6 depicts a third screen rendering 602 of the HQUI 400 that is presented to the user who is attempting to answer questions regarding a digital work. In this screen, the HQUI 400 includes a question presentation area 604 that lists one or more question on the digital work. In this example, the question entered by the user in FIG. 5 (i.e., "Is Juliet said to be the sun or the moon?") is shown in the question presentation area 604. The user who originally posted the question is identified as "John Smith" of Portland Oreg. For this particular question, two possible discrete answers—sun and moon—are given beneath the question in the question presentation area 604. The HQUI 400 provides controls 606 and 608 to facilitate user entry of an answer. That is, the user may select a "Moon" control 606 to answer "moon" or a "Sun" control 608 to answer "sun". The question presentation area 604 may further include statistics 610 on how accurately the user is answering the questions.

The corresponding highlight 406 is shown beneath the question presentation area 604. This helps the user determine the correct answer. If the testing was intended to be more rigorous, the highlights could be kept hidden from the user when the questions are presented. Then, following entry of an answer, the highlighted passage may then be presented to allow the user to determine whether he or she was correct. Further, if the user encounters the same question a second time (e.g., the user is studying materials and reviewing questions repeatedly) and answers it, the HQUI 400 may present the highlighted passage along with the answers given on previous occasions. In this manner, feedback is provided to the user to self-monitor and to assist in the learning process.

Figure 7:
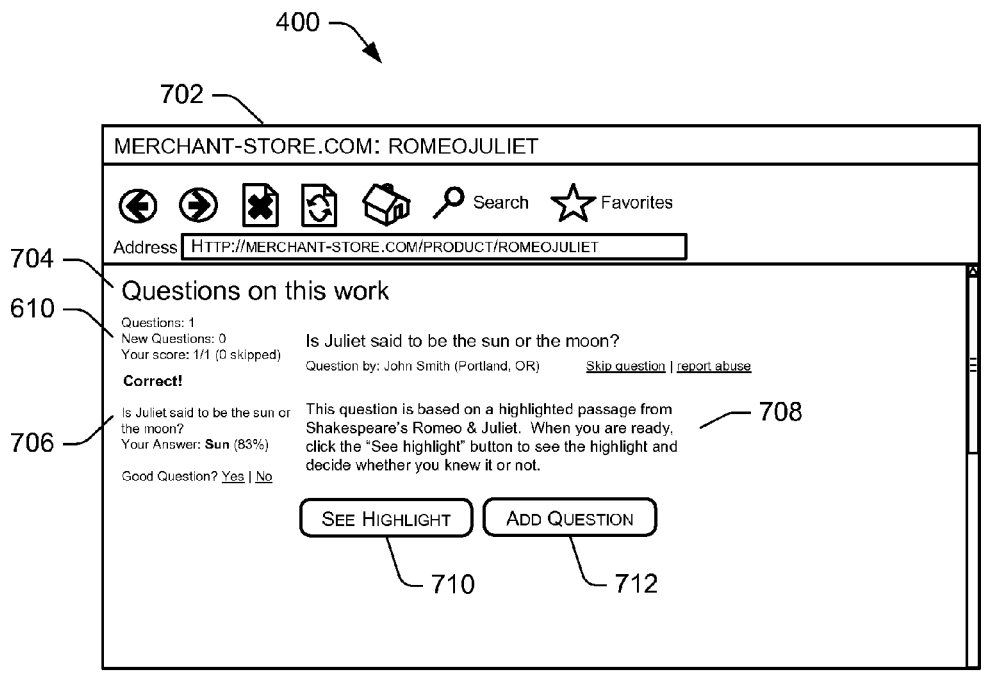
FIG. 7 illustrates a screen rendering of an exemplary user interface that shows results of the quiz taken in FIG. 6.

FIG. 7 depicts another screen rendering 702 of the HQUI 400 that is presented to the user in response to selection of one of the answer controls 606 and 608 in FIG. 6. The HQUI 400 includes an answer results area 704 that shows the outcome of the user's answer to the question. Here, the user answered "sun" by selecting "sun" control 608, and this answer turned out to be correct, as indicated by confirmation feedback 706. The statistics 610 are updated to reflect this correct answer. Further, other metrics may be provided, such as noting that 83% of other users also answered correctly. In addition to such metrics, the answer results area 704 may provide additional information to aid the user in learning more about the question and passage from which it was derived. Here, a statement 708 notes:

> This question is based on a highlighted passage from Shakespeare's *Romeo & Juliet*. When you are ready, click the "See highlight" button to see the highlight and decide whether you knew it or not.

The HQUI 400 provides a "See Highlight" control 710 that, upon activation, presents the highlighted passage for user viewing. Additionally, an "Add Question" control 712 is available if the user wishes to enter his own question.

Figure 8:
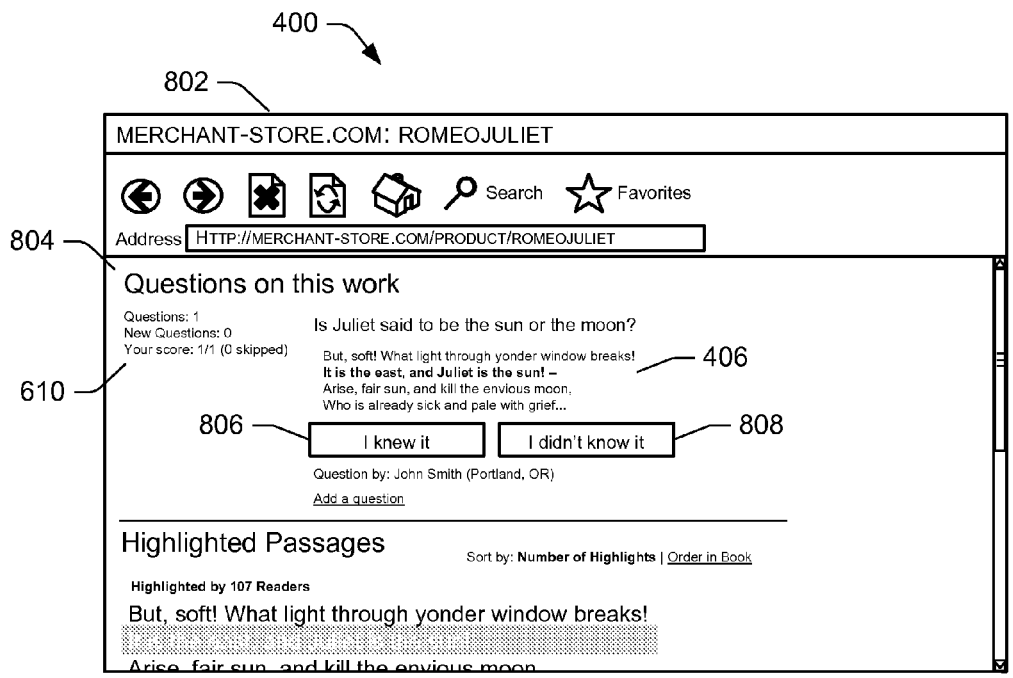
FIG. 8 illustrates a screen rendering of an exemplary user interface that allows a user to evaluate his or her results by presenting the original highlighted passage from which the question was developed.

FIG. 8 illustrates another screen rendering 802 of the HQUI 400, which is presented to the user in response to selection of the "See Highlight" control 710 in FIG. 7. The HQUI 400 includes a self-evaluation area 804 that allows the user to evaluate whether he really knew the answer, or simply guessed it correctly. This self-evaluation area 804 reveals the highlighted passage 406 beneath the question for the user to review the underlying source of the question. Depending upon this self-evaluation, the user may actuate a first control 806 if he knew the correct answer or a second control 808 if he did not. These inputs are also tracked to generate further testing statistics, in addition to the right/wrong statistics 610. It is further noted that activation of the "I didn't know it" control 808 may direct the user to additional information to help the user learn more about the passage, so that he will better understand the question and answer.

Figure 9:
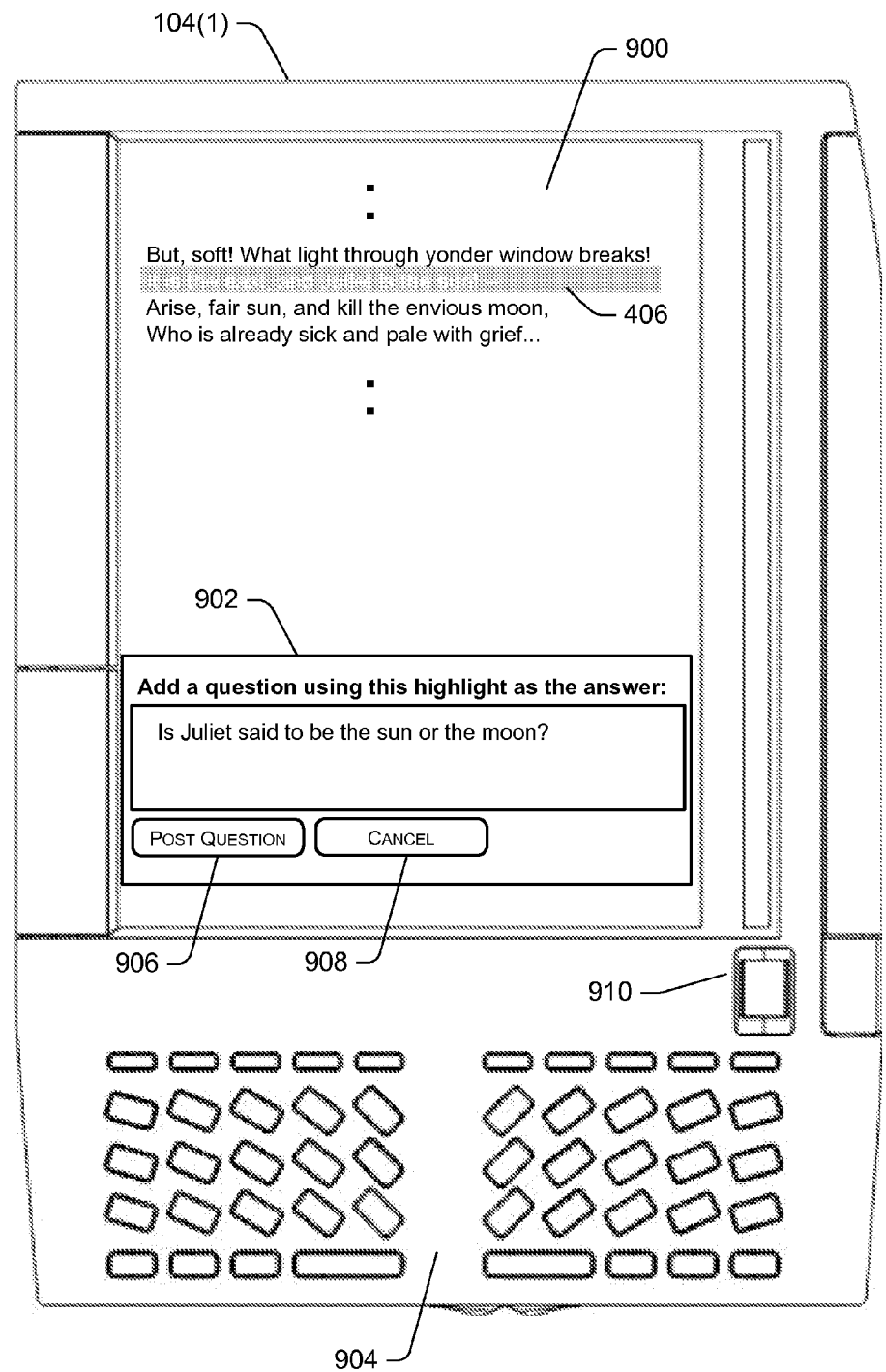
FIG. 9 shows an electronic reader device with a user interface that allows a user to highlight passages of a digital work and ask questions about the passages.
Figure 10:
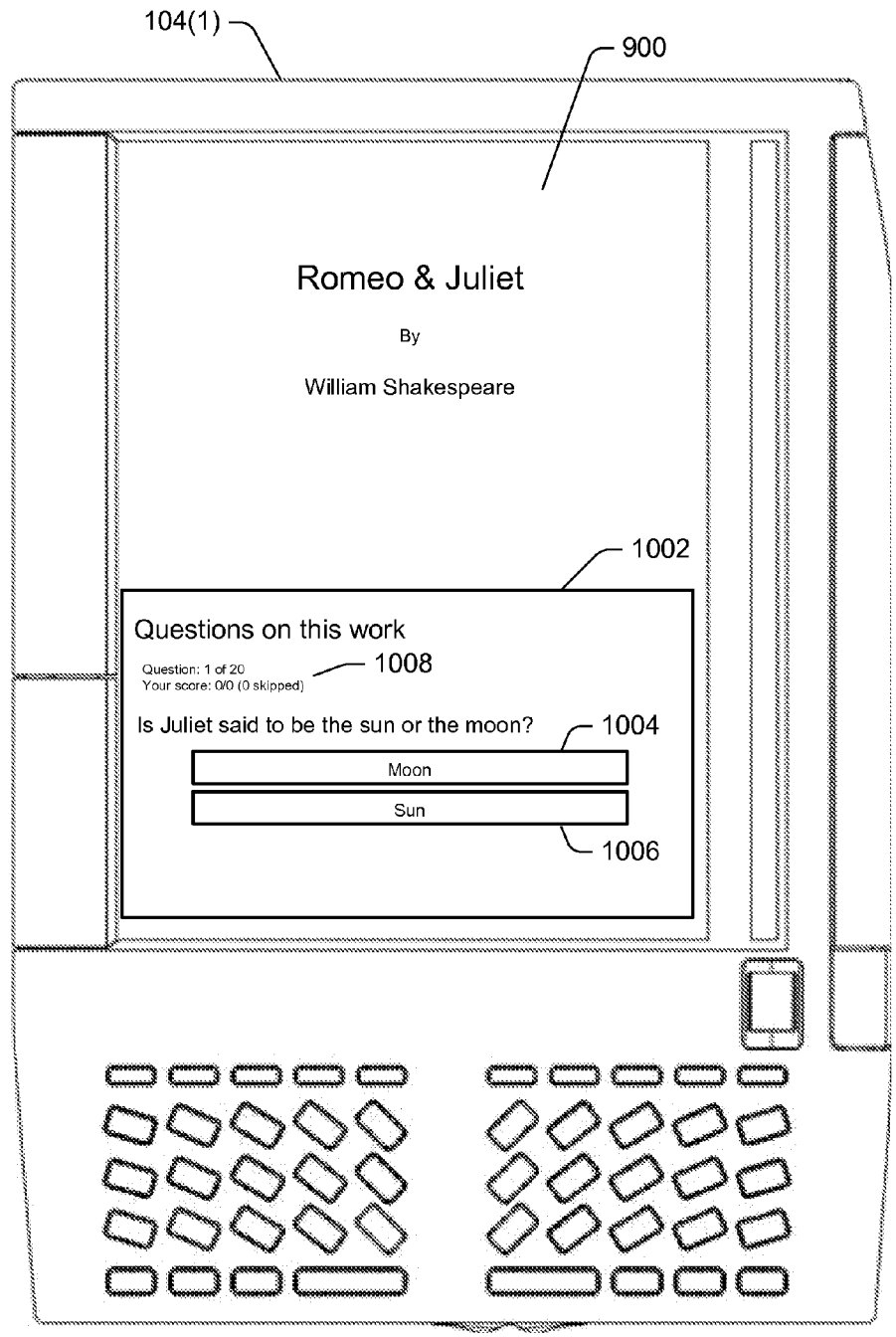
FIG. 10 shows the electronic reader device with a user interface to quiz a user about a certain highlighted passage.
Figure 11:
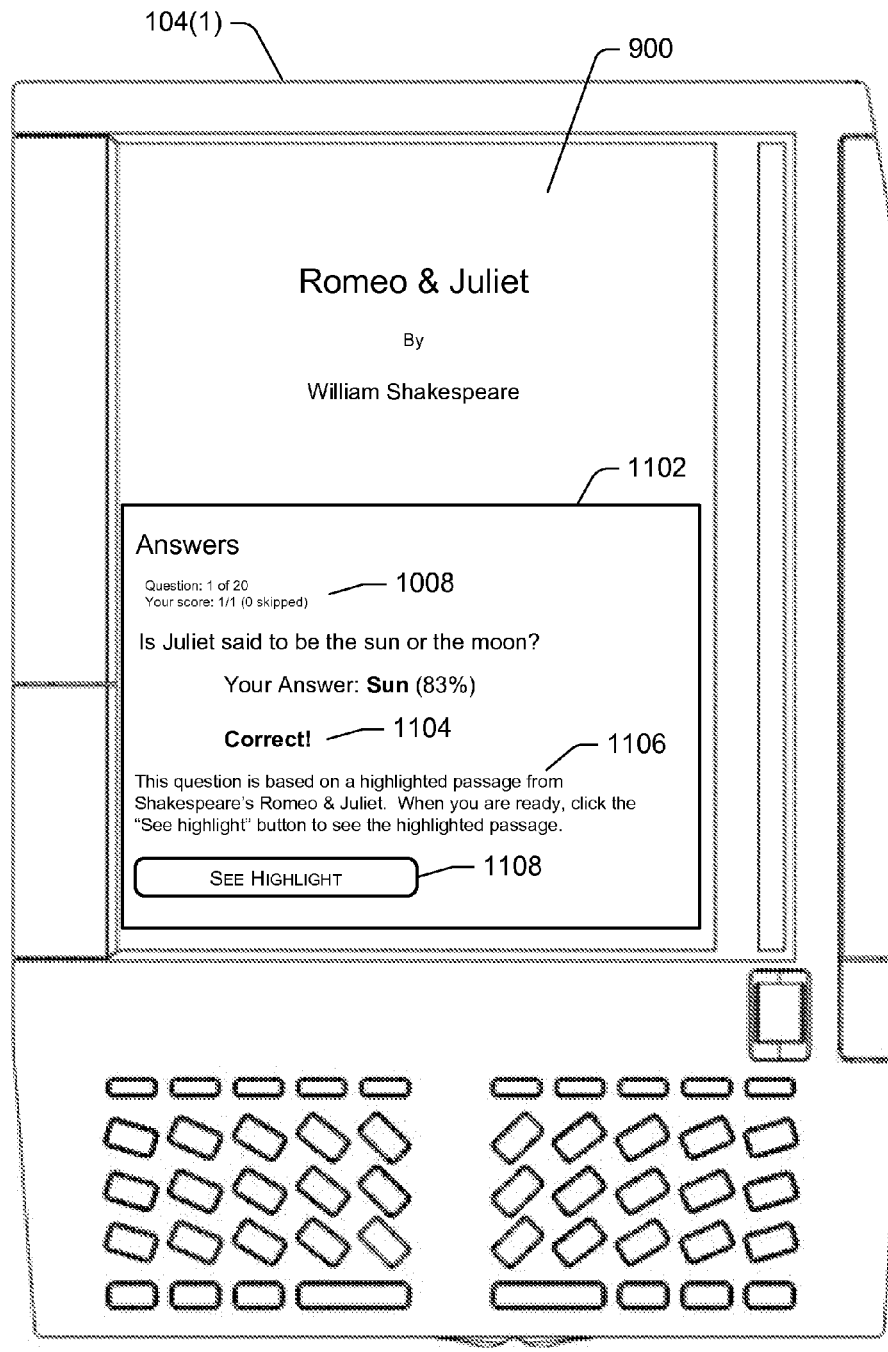
FIG. 11 shows the electronic reader device with a user interface that reveals the results of the quiz taken in FIG. 10.

FIGS. 9-11 show another series of screen shots of an exemplary highlight and question user interface (HQUI) 900 that is adapted to facilitate user entry of highlight questions on an eBook reader device 104(1). Although an eBook reader device is illustrated, it is noted that other types of devices may be used to support other types of user interfaces. For instance, a PDA, communication device, or handheld entertainment device may also implement user interfaces that are different than the browser rendered UI shown in FIGS. 4-8.

FIG. 9 shows a device-adapted HQUI 900 that shows the highlighted passage 406 from *Romeo & Juliet*. The HQUI 900 includes a question entry panel 902 that enables the user to enter a question pertaining to the highlighted passage 406. The keyboard 904 may be used to type in a question. In this example, suppose the user enters the question, "Is Juliet said to be the sun or the moon?" into the question entry panel 902. The HQUI 900 provides a "Post Question" control 906 to allow the user to post the question and a "Cancel" control 908 to permit the user to withdraw the question. A navigation mechanism 910 (e.g., thumbwheel, joystick, touchpad, etc.) allows the user to select among the controls 906 and 908. Upon activation of the "Post Question" control 906, the question is associated with the highlighted passage 406 and the work, *Romeo & Juliet*, and returned to the highlight and question service 114 (FIG. 1).

FIG. 10 shows another view of the HQUI 900 depicted when a user is taking a test and attempting to answer the questions on the eBook reader device 104(1). The HQUI 900 provides a question presentation area 1002 that lists one or more question on the digital work. In this example, the question, "Is Juliet said to be the sun or the moon?" is shown in the question presentation area 1002. The HQUI 900 has first and second controls 1004 and 1006 that allow user selection of the answers "Moon" and "Sun", respectively. The question presentation area 1002 may further show the user's testing statistics 1008. In this test taking mode, the corresponding highlight may be hidden from the user when the questions are presented. Instead, a blank screen or the title of the digital work is merely presented to the user.

Figure 12:
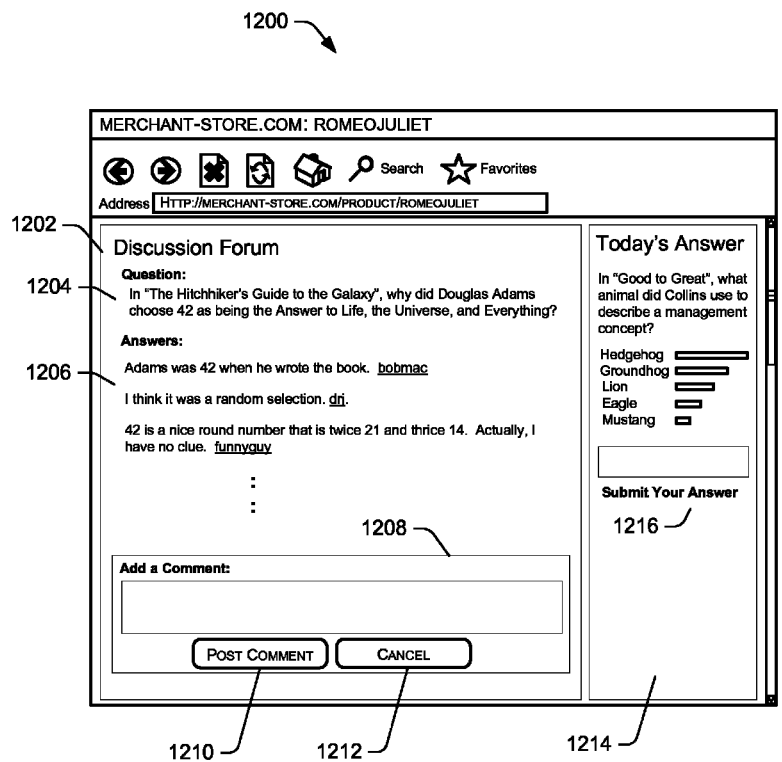
FIG. 12 illustrates a screen rendering of a community user interface in which community members discuss highlighted passages and questions pertaining to such passages.

FIG. 11 shows another view of the HQUI 900 depicted following entry of an answer by selecting one of the controls 1004 and 1006 in FIG. 12. The HQUI 900 includes an answer results area 1102 that shows the outcome of the user's answer to the question. In this example, the user entered the correct answer "sun", as indicated by confirmation feedback 1104. The statistics 1008 are updated to reflect this correct answer. Further, other metrics may be provided, such as noting that 83% of other users also answered correctly. In addition to such metrics, the answer results area 1102 may provide additional information, such as statement 1106, to aid the user in learning more about the question and passage from which it was derived. A "See Highlight" control 1108 is further provided to direct the user to the highlighted passage.

Example Community UI

FIG. 12 shows an example screen rendering of a community UI 1200 in which community members discuss highlighted passages and questions pertaining to such passages. The community UI 1200 is a representative example of the UI 236 that is served by the highlight and question service 114 (FIG. 2) to facilitate more social interaction among members 232 who are enjoying common digital works. The community UI 1200 may be open to the public, or restricted to certain members who register with the highlight and question service 114. In some cases, a subscription fee may be involved.

In this example illustration, the community UI 1200 includes a discussion forum 1202 that allows users to comment and debate questions on the highlighted passages. Here, the question posed to the community pertains to Douglas Adams' work, *The Hitchhiker's Guide to the Galaxy*. The question 1204 is posted at the top of the discussion forum 1202 and various member entries 1206 are posted below. A comment entry area 1208 is located at the bottom of the discussion forum 1202 to permit other members to post comments. The member enters a comment, and then can either post it using the "Post Comment" control 1210 or cancel the comment via the "Cancel" control 1212.

Another aspect of the community UI 1200 is the ability to test the community as a whole on certain trivia or other questions. This feedback captures the "Wisdom of Crowds" effect, and may provide insight for the members of the community. In FIG. 12, the community UI 1200 includes a community answer area 1214 that provides one or more questions for the community to answer. The questions may have a single correct answer, such as the question shown in this illustration, or may have no correct answer. In this example, the question pertains to Jim Collins' work, *Good to Great. The question is:*

In "Good to Great", what animal did Collins use to describe a management concept?

Beneath the question is a list of the top five answers given by the community, which include: Hedgehog, Groundhog, Lion, Eagle, and Mustang. The percentage of the community that submitted these answers is illustrated graphically by the horizontal bars. The correct answer—Hedgehog—received the most answers, revealing that the crowd is correct. It is noted that some questions have a verifiable correct answer, while others do not. In some implementations, a trusted third party may be relied upon to verify the correctness of answers. In other implementations, the answers are merely reflective of those entered by the community, without any regard to correctness, or whether then can even be correct or false.

The community answer area 1214 further includes an entry area 1216 to allow members to enter answers. Upon submission, those answers are tabulated and added to the list of answers.

Operation

Figure 13:
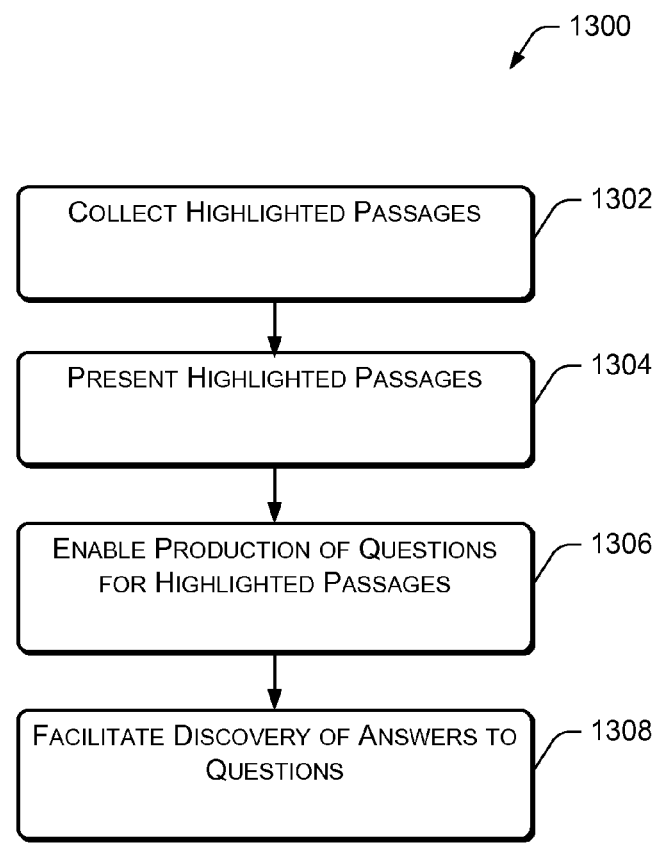
FIG. 13 is a flow diagram for a process of aggregating highlighted passages of digital works and presenting the highlights in a way that facilitates community questioning and discussion of the passages.

FIG. 13 shows a general process 1300 of aggregating highlighted passages of digital works and presenting the highlights in a way that facilitates community questioning and discussion of the passages. The process 1300 (as well as processes 1400 and 1500 in FIGS. 14 and 15) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process 1300 (as well as processes 1400 and 1500 below) is described with reference to the architectures 100 and 200 of FIGS. 1 and 2 and the computing system 300 of FIG. 3. Additional reference may be made to any of the UI renderings in FIGS. 4-12.

At 1302, highlights captured by various users are collected. In the architecture 100 of FIG. 1, for example, various highlighters 102(1)-(N) and 118 highlight passages from various digital works, such as books, magazines, music, video, drawings, and other authored works. The highlights are sent to the highlight and question service 114, where they are stored and associated with the digital works. Where a sufficient number of highlights are received, the highlights may be aggregated to eliminate identical or substantially similar ones.

At 1304, the highlighted passages are presented to the users for consideration. As shown in FIG. 1, the highlight and question service 114 may serve a file of highlights to the various reading devices or serve a web page that can be rendered by a browser. One example listing of highlights is shown in screen rendering 402 of the HQUI 400 in FIG. 4.

At 1306, questions pertaining to the highlighted passages are produced. The question production may be performed with human involvement, or automatically through programmatic means. With respect to the former situation, the HQUI 400 provides a question entry panel 506 that allows the user to enter questions for a highlighted passage (FIG. 5). In another implementation, the HQUI 900 for eBook readers in FIG. 9 also includes a question entry panel 902 that enables the user to enter a question pertaining to the highlighted passage. Alternatively, questions may be automatically generated through using the auto generator 324, which parses the highlights, linguistically analyzes the parsed phrases, and develops questions based thereon.

At 1308, discovery of answers to the questions is facilitated. This may be accommodated in many ways. With reference to FIG. 2, individual readers 202 can answer the questions directly by entering answers via a UI 206 on the eBook reader 204. In another situation, the highlight and question service 114 may pass the questions to an answer service 210 which programmatically finds information relevant to the question in an attempt to answer it. The information is then returned to the highlight and question service 114. In still another context, discovery of answers may involve submitting the question to a mechanical solutions network 220 for possible solutions. The question may further be given to a community 230 of users who can discuss, comment, or debate the question.

Figure 14:
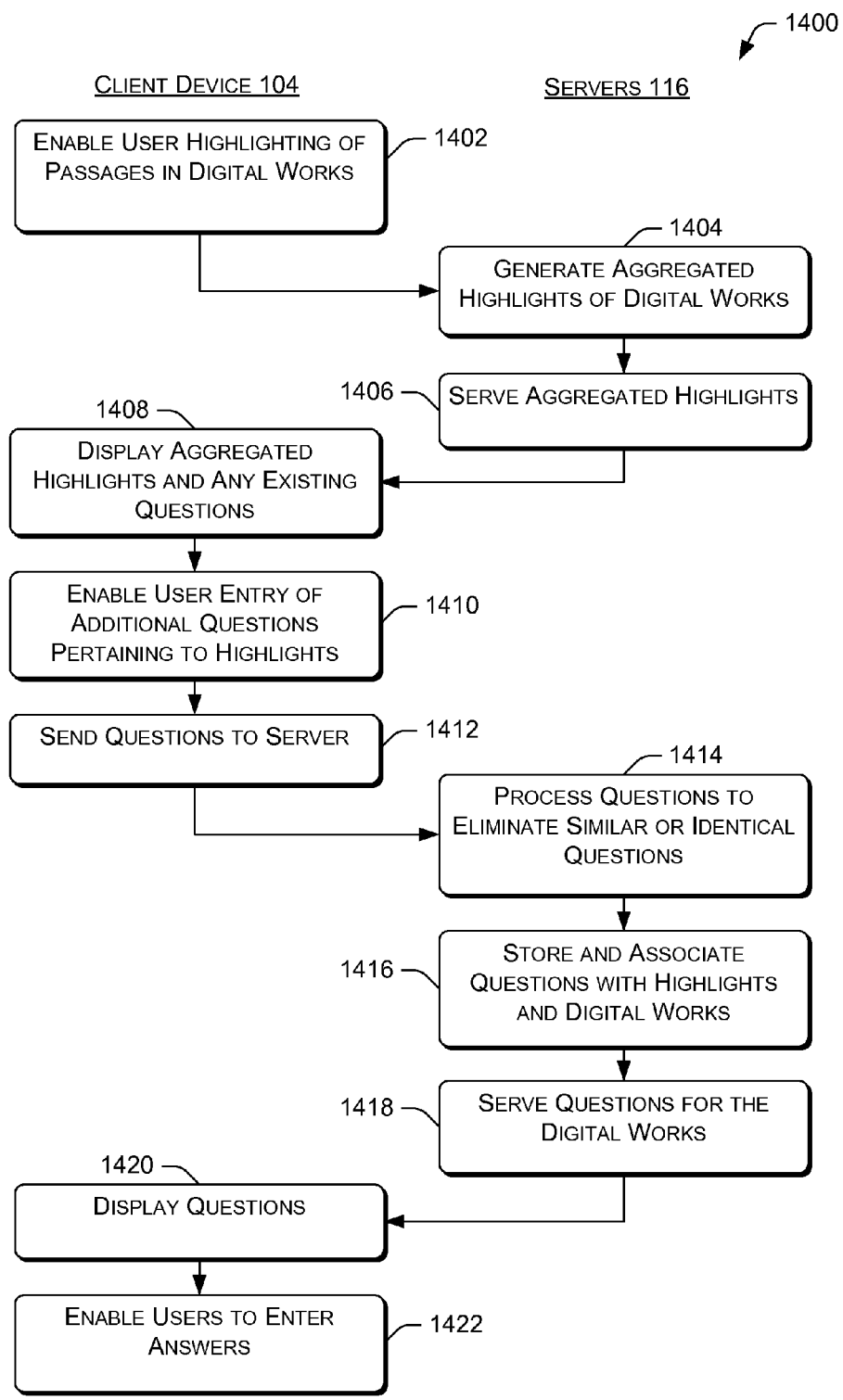
FIG. 14 is a flow diagram for a process of aggregating highlights and allowing users to ask questions pertaining to the highlights.

FIG. 14 shows a more detailed implementation of a process 1400 for aggregating highlights and allowing users to ask questions pertaining to the highlights. In FIG. 14, the operations of process 1400 are described as being performed by either the servers 116(1)-(M) or by a client device 104 of FIG. 1.

At 1402, a client device is configured to permit a user to highlight select passages in a digital work. In an eBook reader device, for example, the user can use input controls (e.g., thumbwheel, joystick, touchpad, etc.) to mark certain excerpts in an eBook (phase, sentence, paragraph, etc.) and capture that as a highlighted passage. The client device stores the highlighted passage and associates that highlighted passage with the digital work. The client device creates a highlight file 336 and returns that file to the highlight and question service 114.

At 1404, the highlights received from the clients are aggregated. In the described implementation, the servers 116(1)-(M) process the highlights and attempt to match highlights to common passages. The servers store the highlights in association with the digital works to which they pertain, such as in the highlight/question database 312.

At 1406, the aggregated highlights are made available to the client devices. The highlights may be provided to the general public, or made available on a restricted access basis, such as to a community or to paid subscribers. As one example, the servers 116(1)-(M) may serve a web page as part of the HQUI 400 in which aggregated highlights are organized in a highlighted passages area 404, as shown in FIG. 4.

At 1408, the aggregated highlights are displayed on the client device. Additionally, any existing questions pertaining to the highlights may be shown or requested. At 1410, user entry of questions pertaining to one or more highlighted passages is enabled. In one implementation, user entry is supported by the HQUI 400, where the user is provided with question entry area 504 to ask questions. At 1412, the questions are submitted to the server.

At 1414, the questions are processed to filter those that are similar and identical to previously received questions. In one implementation, the servers 116(1)-(M) execute a similarity comparator 322 that compares a new question with previous questions stored in the highlight/question database 312. When the new question is found to be identical, or sufficiently similar, to an existing question, the servers discard the question and inform the user that the question is duplicative. At 1416, the questions found to be sufficiently new and unique are stored in the highlight/question database 312 and associated via a data structure with the highlighted passages and digital works.

At 1418, the questions may be served to the client devices alone, or together with the highlighted passages. At 1420, the questions may be presented to the users. As one example, the HQUI 400 may present questions for the user to ponder, as shown in FIG. 6.

At 1422, user entry of answers to the questions is enabled. In the described implementation, user entry of answers is facilitated by the HQUI 400, which provides answer controls 606 and 608 in FIG. 6. In other implementations, a free text entry area may be provided for users to enter free flowing answers.

Figure 15:
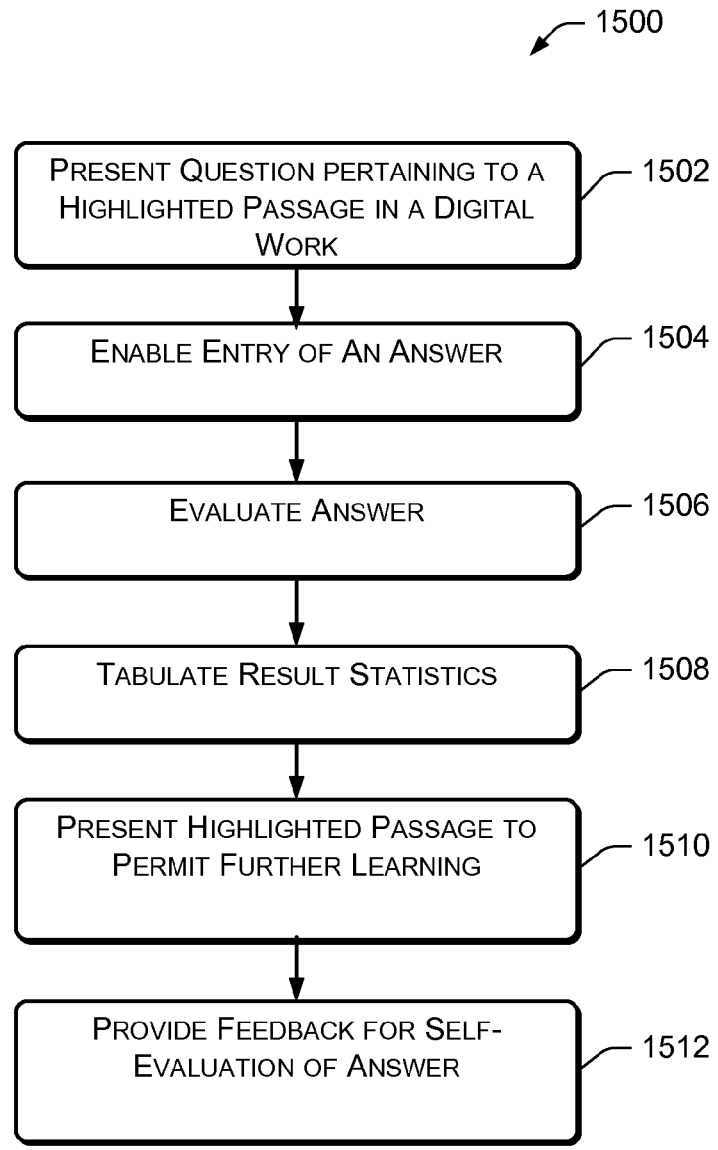
FIG. 15 is a flow diagram for a testing process in which the questions on highlighted passages are used to test users' knowledge of a digital work.

FIG. 15 shows an exemplary process 1500 for using the questions to highlighted passages as a way to test users on their knowledge of a digital work. This may be done in the context of formalized education, with a teacher and students, or in the spirit of challenging fun or trivia.

At 1502, one or more questions pertaining to a highlighted passage of a digital work are presented. Examples of this are shown as the question presentation area 604 in the HQUI 400 in FIG. 6, and the question presentation area 1002 in the eBook adapted HQUI 900 of FIG. 10.

At 1504, user entry of an answer to the question is enabled. Examples of enabling user entry include through use of answer controls 606 and 608 in the HQUI 400 of FIG. 6 and answer controls 1004 and 1006 in the HQUI 900 of FIG. 10.

At 1506, the answer entered by the user is evaluated. In questions structured with true and correct answers, the evaluation operation automatically compares the answer submitted by the user with the correct answer. In other implementations, the answer may be submitted to a third party evaluator to determine whether it is correct. At 1508, the results are tabulated, and revealed to the user. For instance, the results may be presented in the form of feedback (positive or negative) as provided by the confirmation 706 in the HQUI 400 of FIG. 7 or the confirmation 1104 in HQUI 900 in FIG. 11. Performance statistics 610 and 1008 are further tallied and presented as the user progresses through the questions.

At 1510, the highlighted passages are made available for additional learning Examples of presenting the highlighted passages referenced by the questions are shown by the screen rendering 702 in FIG. 7.

At 1512, an opportunity for additional self-evaluation may be provided. For instance, in the HQUI 400 shown in FIG. 8, the user is presented with the opportunity to review the question and highlighted passage and honestly assess whether she knew it or did not know it. This information can be collected and provided to the user as a way to help her know which areas she needs additional study.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   collecting highlights of a digital work entered by a plurality of different users via digital work presentation devices, individual digital work presentation devices having a display, wherein the plurality of different users includes a first user and a second user, and wherein the highlights of the digital work include (i) a first highlight entered by the first user to highlight a first passage, and (ii) a second highlight entered by the second user to highlight a second passage;
   serving the highlights to an individual digital work presentation device for presentation on the display;
   providing a user interface to enable the first user to craft questions, wherein the questions include (i) a first question pertaining to the first highlight entered by the first user to highlight the first passage, and (ii) a second question pertaining to the second highlight entered by the second user to highlight the second passage;

storing the questions in association with the highlights to which the questions pertain;

serving the questions in association with the highlights for presentation on the display;

comparing the first question to a plurality of questions that pertain to highlights of the first passage, wherein comparing the first question to the plurality of questions further comprises comparing one or more words of the first question to the plurality of questions that pertain to the highlights of the first passage;

grouping the first question and the plurality of questions in one or more groups based at least in part on the comparing the first question to the plurality of questions; and facilitating discovery of answers to the questions.

2. The computer-implemented method of claim 1, wherein the digital work comprises an electronic book and one of the digital work presentation devices comprises an electronic book reader device.

3. The computer-implemented method of claim 1, wherein the serving of the highlights comprises serving browser-renderable content that, when rendered, lists the highlights on the display.

4. The computer-implemented method of claim 3, wherein the providing the user interface comprises providing an entry area proximal to the first highlight for the first user to enter the first question.

5. The computer-implemented method of claim 1, wherein the providing the user interface comprises presenting, on an electronic reading device, a question entry panel in association with a highlight of the digital work, and facilitating the first user to enter a question in the question entry panel.

6. The computer-implemented method of claim 1, wherein the facilitating discovery of answers comprises enabling users to enter answers to the questions.

7. The computer-implemented method of claim 6, further comprising presenting a highlight of the digital work following entry of a user's answer to a question pertaining to the highlight.

8. The computer-implemented method of claim 6, further comprising measuring a time duration from presentation of a question on the display until entry of an answer to the question.

9. The computer-implemented method of claim 1, wherein the facilitating discovery of answers comprises providing an electronic forum to submit answers to the questions.

10. The computer-implemented method of claim 1, wherein the facilitating discovery of answers comprises submitting the questions to a mechanical solution network.

11. The computer-implemented method of claim 1, wherein the facilitating discovery of answers comprises conducting an electronic search for the answers.

12. The computer-implemented method of claim 1, further comprising aggregating the highlights of the digital work from a plurality of highlights entered by the a plurality of different users.

13. The computer-implemented method of claim 1, further comprising evaluating the questions to determine whether any two questions are identical.

14. The method of claim 1, further comprising evaluating the questions to ascertain whether two or more questions are substantially the same as one another.

15. The computer-implemented method of claim 1, further comprising allowing other users to edit the questions.

16. The computer-implemented method of claim 1, further comprising enabling a community of people to vote on the questions.

17. The computer-implemented method of claim 1, wherein comparing the first question to the plurality of questions further comprises:

comparing one or more phrases of the first question to the plurality of questions that pertain to the highlights of the first passage.

18. The computer-implemented method of claim 1, wherein grouping the first question and the plurality of questions in one or more groups further comprises:

based on comparing the first question to the plurality of questions, determining that the first question and a particular question of the plurality of questions have a similarity that is greater than a threshold; and based on determining that the first question and the particular question of the plurality of questions have a similarity that is greater than the threshold, grouping the first question and the particular question in a first group of the one or more groups.

19. The computer-implemented method of claim 1, further comprising:

based on comparing the first question to the plurality of questions, determining that the first question and a particular question of the plurality of questions have a similarity that is greater than a threshold; and based on determining that the first question and the particular question have a similarity that is greater than the threshold, deleting one of the first question or the second question.

20. The computer-implemented method of claim 1, further comprising:

based on comparing the first question to the plurality of questions, determining that the first question and a particular question of the plurality of questions are identical; and based on determining that the first question and the particular question are identical, deleting one of the first question or the second question.

21. A computer-implemented method, comprising:

collecting highlights of a digital work received from a plurality of digital work presentation devices wherein the highlights of the digital work include a first highlight entered to highlight a first passage;

collecting questions crafted by one or more users, wherein each of the questions pertains to a corresponding highlight of a corresponding passage of the digital work, wherein the questions include a first question pertaining to the first highlight to highlight the first passage;

storing the questions in association with the highlights to which the questions pertain;

comparing the first question to a plurality of questions that pertain to highlights of the first passage, wherein comparing the first question to the plurality of questions further comprises comparing one or more phrases of the first question to the plurality of questions that pertain to the highlights of the first passage; and grouping the first question and the plurality of questions in one or more groups based at least in part on the comparing the first question to the plurality of questions.

22. The computer-implemented method of claim 21, wherein comparing the first question to the plurality of questions further comprises:

comparing one or more words of the first question to the plurality of questions that pertain to the highlights of the first passage.

23. The computer-implemented method of claim 21, wherein grouping the first question and the plurality of questions in one or more groups further comprises:
based on comparing the first question to the plurality of questions, determining that the first question and a second question of the plurality of questions have a similarity that is greater than a threshold; and
based on determining that the first question and the second question of the plurality of questions have a similarity that is greater than the threshold, grouping the first question and the second question in a group of the one or more groups.

24. The computer-implemented method of claim 21, further comprising:
based on comparing the first question to the plurality of questions, determining that the first question and a second question of the plurality of questions have a similarity that is greater than a threshold; and
based on determining that the first question and the second question have a similarity that is greater than the threshold, deleting one of the first question or the second question.

25. The computer-implemented method of claim 21, further comprising:
based on comparing the first question to the plurality of questions, determining that the first question and a second question of the plurality of questions are identical; and
based on determining that the first question and the second question are identical, deleting one of the first question or the second question.

26. The computer-implemented method of claim 21, wherein the digital work comprises an electronic book and one of the digital work presentation devices comprises an electronic book reader device.

27. The computer-implemented method of claim 21, further comprising:
serving the highlights to an individual digital work presentation device for presentation on a display of the individual digital work presentation device, wherein the serving the highlights comprises serving browser-renderable content that, when rendered, lists the highlights on the display.

28. The computer-implemented method of claim 21, further comprising:
providing a user interface to enable a user to craft questions, wherein the providing the user interface comprises presenting, on an electronic reading device, a question entry panel in association with a highlight of the digital work, and facilitating the user to enter a question in the question entry panel.

29. The computer-implemented method of claim 21, further comprising facilitating discovery of answers to the first question by enabling users to enter answers to the first question.

30. The computer-implemented method of claim 21, further comprising presenting a highlight of the digital work following entry of a user's answer to a question pertaining to the highlight.

31. The computer-implemented method of claim 21, further comprising measuring a time duration from presentation of a question on a display until entry of an answer to the question.

32. A computer-implemented method, comprising:
receiving a highlighted passage of a digital work, wherein the digital work comprises a plurality of passages that includes the highlighted passage;
receiving a question pertaining to the highlighted passage;
comparing the first question to a plurality of questions that pertain to the highlighted passage, wherein comparing the question to the plurality of questions further comprises
comparing one or more words of the question to the plurality of questions that pertain to the highlighted passage; and
grouping the question and the plurality of questions in one or more groups based at least in part on the comparing the question to the plurality of questions.

33. The computer-implemented method of claim 32, further comprising:
receiving an answer to the question.

34. The computer-implemented method of claim 32, wherein the question is crafted before the highlighted passage is highlighted.

35. The computer-implemented method of claim 32, further comprising generating an audible version of the question.

36. The computer-implemented method of claim 32, wherein the highlighted passage is highlighted by a first user, and the question is crafted by a second user.

* * * * *